United States Patent
Rappl et al.

(10) Patent No.: US 12,465,994 B2
(45) Date of Patent: Nov. 11, 2025

(54) WELDING ASSET TRACKING WITH HEARTBEAT MONITORING

(71) Applicant: ILLINOIS TOOL WORKS INC., Glenview, IL (US)

(72) Inventors: James Francis Rappl, Neenah, WI (US); Todd Holverson, Appleton, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 18/507,405

(22) Filed: Nov. 13, 2023

(65) Prior Publication Data

US 2024/0082943 A1 Mar. 14, 2024

Related U.S. Application Data

(63) Continuation of application No. 16/934,310, filed on Jul. 21, 2020, now Pat. No. 11,833,625.
(Continued)

(51) Int. Cl.
*G05B 13/02* (2006.01)
*B23K 9/095* (2006.01)
(Continued)

(52) U.S. Cl.
CPC .......... *B23K 9/0956* (2013.01); *B23K 9/1062* (2013.01); *G05B 13/024* (2013.01);
(Continued)

(58) Field of Classification Search
None
See application file for complete search history.

(56) References Cited

U.S. PATENT DOCUMENTS 4,716,267 A * 12/1987 Reynolds ............... B23K 11/25
219/113
6,267,291 B1 7/2001 Blankenship
(Continued)

FOREIGN PATENT DOCUMENTS

| CN | 101391334 | 3/2009 |
| CN | 101813782 | 8/2010 |

(Continued)

OTHER PUBLICATIONS

Canada Patent Office, Examination Report, Application No. 3,089,576, mailed Jun. 26, 2024 6 pages.
(Continued)

*Primary Examiner* — Jason Lin
(74) *Attorney, Agent, or Firm* — McAndrews, Held & Malloy, Ltd.

(57) ABSTRACT

Apparatus and methods for welding asset tracking with heartbeat monitoring are disclosed. In some examples, a welding asset tracking system may comprise an asset tracking network of tags, hubs, and/or gateways retained by welding assets within a welding area. The welding asset tracking system may generate heartbeat signals that certain welding assets may require for normal operation, so as to ensure the welding assets are used in appropriate welding contexts and/or welding areas. In some examples, information obtained from the asset tracking network may be used to determine whether one or more heartbeat signals should be discontinued.

20 Claims, 7 Drawing Sheets

Related U.S. Application Data

(60) Provisional application No. 62/889,901, filed on Aug. 21, 2019.

(51) Int. Cl.
  *B23K 9/10* (2006.01)
  *G06F 3/01* (2006.01)
  *H04L 67/125* (2022.01)
  *H04W 4/20* (2018.01)

(52) U.S. Cl.
  CPC ............ *G06F 3/015* (2013.01); *G06F 3/017* (2013.01); *H04L 67/125* (2013.01); *H04W 4/20* (2013.01)

(56) References Cited

U.S. PATENT DOCUMENTS

| | | | |
|---|---|---|---|
| 6,479,792 B1 | 11/2002 | Beiermann | |
| 6,536,660 B2 | 3/2003 | Blankenship et al. | |
| 6,734,393 B1* | 5/2004 | Friedl | B23K 9/32 219/130.01 |
| 7,032,814 B2 | 4/2006 | Blankenship | |
| 7,045,742 B2* | 5/2006 | Feichtinger | B23K 9/0953 219/132 |
| 7,363,137 B2 | 4/2008 | Brant | |
| 7,574,172 B2 | 8/2009 | Clark et al. | |
| 7,643,890 B1* | 1/2010 | Hillen | B23K 9/1087 700/83 |
| 8,502,661 B2 | 8/2013 | Mauro | |
| 8,621,062 B1* | 12/2013 | Anderson | H04L 41/00 709/226 |
| 8,686,318 B2 | 4/2014 | Albrecht et al. | |
| 8,748,776 B2 | 6/2014 | Albrecht | |
| 9,119,023 B2 | 8/2015 | Dina | |
| 9,129,330 B2 | 9/2015 | Albrecht | |
| 9,138,825 B2 | 9/2015 | Albrecht | |
| 9,167,408 B2 | 10/2015 | Bucci | |
| 9,204,257 B1 | 12/2015 | Mendelson | |
| 9,270,520 B2 | 2/2016 | Dina | |
| 9,449,498 B2 | 9/2016 | Dina et al. | |
| 9,454,744 B2 | 9/2016 | Imming | |
| 9,642,112 B2 | 5/2017 | Costa | |
| 9,652,955 B1 | 5/2017 | Ray | |
| 9,712,947 B2 | 7/2017 | Dina | |
| 9,756,456 B2 | 9/2017 | Dina | |
| 9,817,947 B2 | 11/2017 | Hermans | |
| 9,862,048 B2 | 1/2018 | Holverson et al. | |
| 9,998,804 B2 | 6/2018 | Awiszus et al. | |
| 10,140,834 B2 | 11/2018 | Barcala | |
| 10,181,060 B2 | 1/2019 | Krug | |
| 10,248,105 B2 | 4/2019 | Gitter | |
| 10,286,475 B2 | 5/2019 | Dina | |
| 10,419,929 B2 | 9/2019 | Dina | |
| 10,685,194 B2* | 6/2020 | Lu | G06K 7/1091 |
| 10,748,442 B2 | 8/2020 | Batzler | |
| 10,977,756 B2 | 4/2021 | Cheng | |
| 2002/0081020 A1* | 6/2002 | Shimazu | G06Q 30/02 382/154 |
| 2002/0168937 A1 | 11/2002 | Clark | |
| 2004/0022227 A1 | 2/2004 | Lynch | |
| 2005/0145688 A1 | 7/2005 | Milenkovic | |
| 2005/0197115 A1 | 9/2005 | Clark et al. | |
| 2005/0258154 A1* | 11/2005 | Blankenship | B23K 9/0953 219/130.21 |
| 2006/0022867 A1 | 2/2006 | Hessing | |
| 2006/0097046 A1* | 5/2006 | Baru Fassio | G08B 13/2462 340/8.1 |
| 2006/0173619 A1 | 8/2006 | Brant | |
| 2007/0080150 A1* | 4/2007 | Albrecht | B23K 9/1087 219/130.01 |
| 2007/0080153 A1* | 4/2007 | Albrecht | B23K 9/1062 219/130.01 |
| 2007/0205894 A1 | 9/2007 | Nelson | |
| 2008/0030330 A1* | 2/2008 | Vock | A61B 5/6833 340/568.1 |
| 2008/0055154 A1* | 3/2008 | Martucci | G08B 21/0269 342/357.55 |
| 2008/0061049 A1 | 3/2008 | Albrecht | |
| 2008/0243306 A1* | 10/2008 | Koike | B25J 9/1676 700/250 |
| 2008/0276179 A1 | 11/2008 | Borenstein | |
| 2009/0272222 A1* | 11/2009 | Long | G05G 1/305 29/428 |
| 2010/0224610 A1 | 9/2010 | Wallace | |
| 2011/0080267 A1 | 4/2011 | Clare et al. | |
| 2012/0050101 A1* | 3/2012 | Whiteman | G01S 19/14 701/519 |
| 2012/0085741 A1 | 4/2012 | Holverson et al. | |
| 2012/0130534 A1 | 5/2012 | Wurm | |
| 2012/0200385 A1 | 8/2012 | Savage | |
| 2013/0200055 A1 | 8/2013 | Enyedy et al. | |
| 2013/0282392 A1 | 10/2013 | Wurm | |
| 2013/0332323 A1 | 12/2013 | Phillips | |
| 2013/0346261 A1 | 12/2013 | Phillips | |
| 2014/0048522 A1* | 2/2014 | Dina | B23K 9/0953 219/132 |
| 2014/0124493 A1 | 5/2014 | Enyedy | |
| 2014/0240125 A1 | 8/2014 | Burch | |
| 2014/0284323 A1 | 9/2014 | Albrecht | |
| 2014/0327521 A1* | 11/2014 | Chen | G06Q 10/087 340/8.1 |
| 2015/0114941 A1 | 4/2015 | Denis et al. | |
| 2015/0206094 A1 | 7/2015 | Hayes | |
| 2015/0230058 A1* | 8/2015 | Cho | G01S 5/0264 455/456.1 |
| 2015/0319572 A1* | 11/2015 | Jalali | H04W 4/021 455/456.1 |
| 2015/0332071 A1 | 11/2015 | Hoffa | |
| 2015/0375323 A1 | 12/2015 | Becker | |
| 2016/0033635 A1* | 2/2016 | Hansen | G01S 13/75 342/451 |
| 2016/0045971 A1 | 2/2016 | Holverson | |
| 2016/0125594 A1* | 5/2016 | Becker | B23K 31/00 315/246 |
| 2016/0219405 A1 | 7/2016 | Mishra | |
| 2016/0260301 A1* | 9/2016 | Miller | G06Q 10/087 |
| 2016/0373457 A1 | 12/2016 | Matson | |
| 2017/0214117 A1 | 7/2017 | Gracyk et al. | |
| 2018/0124558 A1 | 5/2018 | Stampfl | |
| 2018/0193939 A1 | 7/2018 | Holverson et al. | |
| 2018/0309935 A1 | 10/2018 | Bashkin | |
| 2019/0070686 A1 | 3/2019 | Kooken et al. | |
| 2019/0176323 A1* | 6/2019 | Coady | B65G 1/0421 |
| 2019/0199596 A1* | 6/2019 | Daniel | B23K 9/1006 |
| 2019/0210135 A1 | 7/2019 | Dina et al. | |
| 2019/0272458 A1* | 9/2019 | Khoche | C09J 7/38 |
| 2021/0121330 A1 | 4/2021 | Lobner | |

FOREIGN PATENT DOCUMENTS

| | | |
|---|---|---|
| CN | 102749900 | 10/2012 |
| CN | 103065210 | 4/2013 |
| CN | 104245207 | 12/2014 |
| CN | 104486975 | 4/2015 |
| CN | 104704911 | 6/2015 |
| CN | 108027950 | 5/2018 |
| CN | 108121926 | 6/2018 |
| CN | 109454311 | 3/2019 |
| CN | 109791649 | 5/2019 |
| CN | 109873870 | 6/2019 |
| CN | 206235812 U * | 6/2019 |
| EP | 3247525 | 11/2017 |
| JP | H1148340 | 2/1999 |
| KR | 20030083652 | 10/2003 |
| KR | 20090128646 | 12/2009 |

(56) References Cited

FOREIGN PATENT DOCUMENTS

| WO | 2013163338 | 10/2013 |
|---|---|---|
| WO | 2017222734 | 12/2017 |

OTHER PUBLICATIONS

Tile, Inc., "Find Your Keys, Wallet & Phone with Tile's App and Bluetooth Tracker Device", retrieved from https://www.thetileapp.com/en-us/, retrieved on Jul. 9, 2020, 12 pages.
Milwaukee Tool, "TICK Tool and Equipment Tracker—48-21-2000," retrieved from https://milwaukeetool.com/Prodcuts/Power-Tools/48-21-2000, retrieved on Jul. 9, 2020, 6 pages.
European Patent Office, Extended European Search Report, Application No. 20190175.8, mailed Mar. 4, 2021, 5 pages.
European Patent Office, Extended European Search Report, Application No. 20190185.7, mailed Mar. 4, 2021, 5 pages.
European Patent Office, Extended European Search Report, Application No. 20191265.6, mailed Mar. 9, 2021, 7 pages.
European Patent Office, Extended European Search Report, Application No. 20191250.8, mailed Mar. 4, 2021, 11 pages.
European Patent Office, Extended European Search Report, Application No. 20191258.1, mailed Mar. 9, 2021, 6 pages.
Canada Patent Office, Examination Report, Application No. 3,089,986, mailed Sep. 2, 2021, 2 pages.
Canada Patent Office, Examination Report, Application No. 3,088,377, mailed Nov. 2, 2021, 8 pages.
European Patent Office, Office Action, Appln No. 20191250.8, mailed Jan. 31, 2022, 5 pages.
European Patent Office, Office Action, Application No. 20190175.8, mailed Feb. 11, 2022, 4 pages.
European Patent Office, Office Action, Application No. 20191258.1, mailed Feb. 11, 2022, 4 pages.
European Patent Office, Office Action, Application No. 20191265.6, mailed Feb. 11, 2022, 4 pages.
European Patent Office, Office Action, Application No. 20190185.7, mailed Feb. 11, 2022, 5 pages.
European Patent Office, Office Action, Application No. 20190175.8, mailed Oct. 20, 2022, 5 pages.
European Patent Office, Office Action, Application No. 20190185.7, mailed Oct. 20, 2022, 5 pages.
European Patent Office, Office Action, Application No. 20190175.8, mailed Jun. 28, 2023, 7 pages.

* cited by examiner

WELDING ASSET TRACKING WITH HEARTBEAT MONITORING

CROSS REFERENCE TO RELATED APPLICATIONS

This application is a continuation of, and claims priority to, co-pending U.S. patent application Ser. No. 16/934,310 entitled "WELDING ASSET TRACKING WITH HEARTBEAT MONITORING," filed Jul. 21, 2020, which claims priority from, and the benefit of, U.S. Provisional Application Ser. No. 62/889,901 entitled "WELDING ASSET TRACKING WITH HEARTBEAT MONITORING," filed Aug. 21, 2019, the entirety of all which are hereby incorporated by reference.

TECHNICAL FIELD

The present disclosure generally relates to welding asset tracking and, more particularly, to welding asset tracking with heartbeat monitoring.

BACKGROUND

Numerous welding assets may be employed in large welding environments, such as construction sites, factories, manufacturing yards, and shipyards. As welding assets of similar types can be difficult to distinguish from one another, locating a particular welding asset in a large welding environment, or across multiple welding environments, can be difficult and time consuming. Additionally, lost, misplaced, and/or stolen welding assets can be costly to replace. Further, reallocating welding assets from one welding job to another, without first knowing if and/or how the welding assets are being used, can be inefficient.

Limitations and disadvantages of conventional and traditional approaches will become apparent to one of skill in the art, through comparison of such systems with the present disclosure as set forth in the remainder of the present application with reference to the drawings.

BRIEF SUMMARY

The present disclosure is directed to welding asset tracking with heartbeat monitoring, substantially as illustrated by and/or described in connection with at least one of the figures, and as set forth in the claims.

These and other advantages, aspects and novel features of the present disclosure, as well as details of an illustrated example thereof, will be more fully understood from the following description and drawings.

Figure 1:
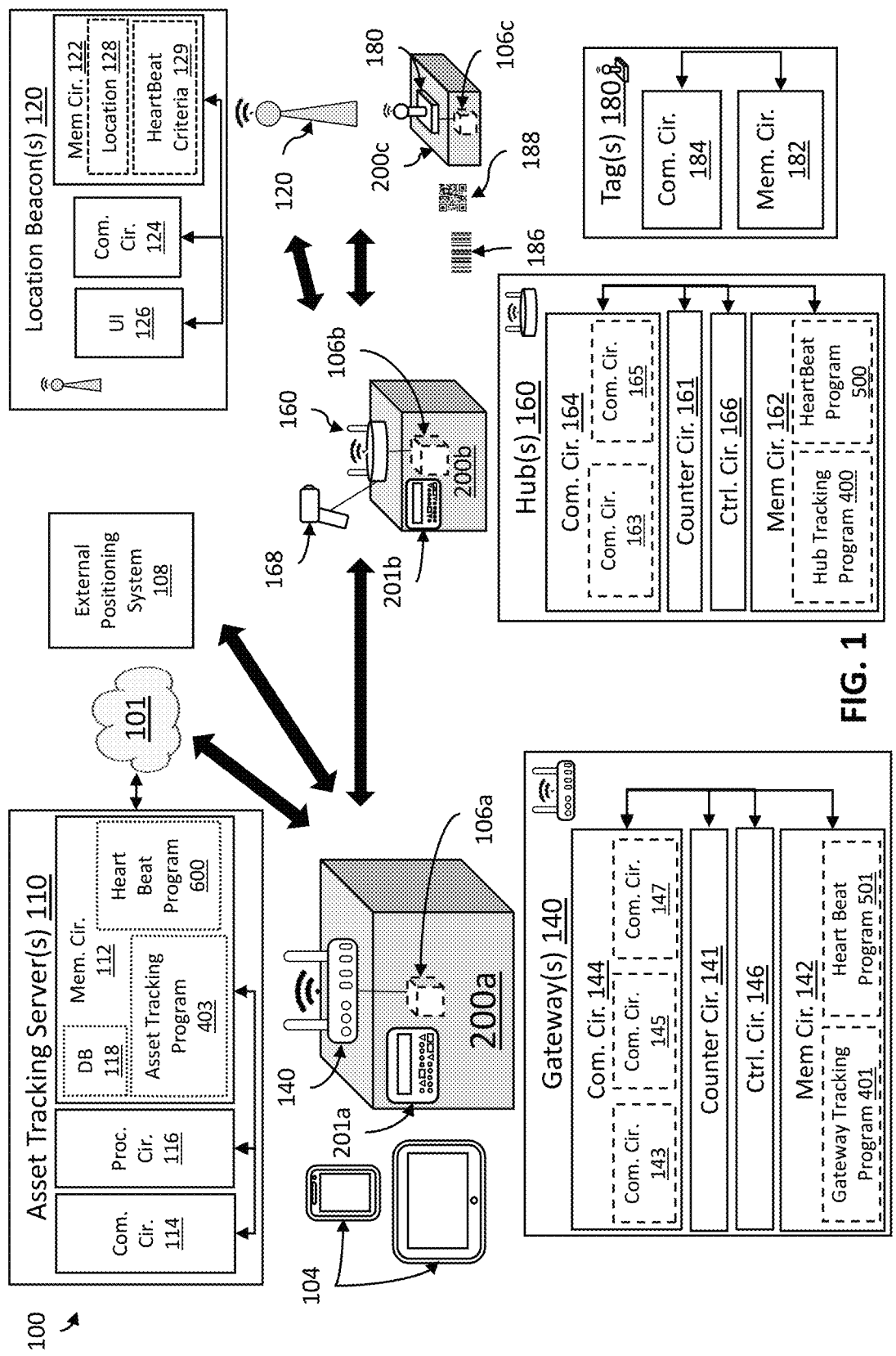
FIG. 1 depicts a welding asset tracking system, in accordance with aspects of this disclosure.

The figures are not necessarily to scale. Where appropriate, the same or similar reference numerals are used in the figures to refer to similar or identical elements. For example, reference numerals utilizing lettering (e.g., sensor 106a, sensor 106b) refer to instances of the same reference numeral that does not have the lettering (e.g., sensors 106).

DETAILED DESCRIPTION

Some examples of the present disclosure relate to a welding asset tracking system. In some examples, the welding asset tracking system may comprise an asset tracking network of tags, hubs, and/or gateways retained by welding assets within a welding area. The asset tracking network may obtain and/or communicate to an asset tracking server welding data related to one or more of the welding assets, as well as position data obtained via an internal and/or external positioning system. In this way, the welding asset tracking server may continually receive updated information regarding each welding assets identity, location, and/or use. By retaining the asset tracking network within welding assets, the asset tracking network becomes more likely to have the density necessary for continuous tracking, since welding assets tend to be positioned near other welding assets so that they can be used together. The information obtained by the welding asset tracking system may be used by a welding asset manager to locate welding assets, allocate assets to different welding jobs, determine whether assets should be brought in for maintenance, and/or determine whether new assets should be acquired.

In some examples, the welding asset tracking system may include one or more hubs and/or gateways comprising one or more heartbeat receivers configured to listen for one or more heartbeat signals from one or more heartbeat generators. In some examples, the welding asset tracking system may additionally include one or more hubs, gateways, and/or location beacons comprising heartbeat generators configured to provide one or more heartbeat signals to the one or more heartbeat receivers. In some examples, the welding asset tracking server may command one or more heartbeat generators to stop sending the required heartbeat signal(s) if, for example, the server determines the welding asset is due for maintenance and/or is being used inappropriately. In some examples, the welding asset may emit an alert, become disabled, go into a sleep or standby mode, and/or take some other action if a certain (e.g., time and/or parameter) threshold is reached without receiving a heartbeat signal. In some examples, this heartbeat monitoring provides an assurance that the welding asset is still operating appropriately and/or within the appropriate welding area.

Some examples of the present disclosure relate to a welding device, comprising communication circuitry configured to receive a heartbeat signal from a welding asset tracking system, a counter configured to track a date, a time, or a welding parameter since receiving the heartbeat signal, processing circuitry, and memory circuitry comprising a first threshold and computer readable instructions that, when executed, cause the processing circuitry to determine whether the first threshold has been reached based on the counter, and put the welding device in an expiration state in response to determining the first threshold has been reached.

In some examples, the expiration state comprises a state where the welding device is disabled, the welding device is in a sleep or standby mode, or the welding device emits a warning that the first threshold has been reached. In some examples, the first threshold comprises an expiration date, an expiration time limit, or an expiration welding parameter limit. In some examples, the welding parameter comprises a number of welding arcs, an arc time, an expended welding energy, a consumable usage, an engine running time, or a fan on time. In some examples, the expiration state comprises a state where the welding device is disabled, and wherein the memory circuitry further comprises a second threshold and computer readable instructions that, when executed, further cause the processing circuitry to determine whether a second threshold has been reached based on the counter, and in response to determining the second threshold has been reached, emit a warning of imminent deactivation.

In some examples, the welding device further comprises power conversion circuitry configured to receive input power, the processing circuitry configured to control the power conversion circuitry to output welding-type power when the welding device is enabled and to cease outputting welding-type power when the welding device is disabled. In some examples, the welding device further comprises a wire feed motor configured to drive a wire feed roller, the processing circuitry configured to control the wire feed motor to selectively drive the wire feed roller when the welding device is enabled, and to control the wire feed motor to cease driving of the wire feed roller when the welding device is disabled. In some examples, the memory circuitry comprises computer readable instructions that, when executed, further cause the processing circuitry to re-enable the welding device and reset the counter in response to receiving the heartbeat signal. In some examples, the memory circuitry comprises computer readable instructions that, when executed, further cause the processing circuitry processor to reset the counter in response to receiving the heartbeat signal. In some examples, the welding device further comprises an operator interface, wherein the memory circuitry comprises computer readable instructions that, when executed, further cause the processing circuitry to reset the counter in response to receiving an administrative override via the operator interface.

Some examples of the present disclosure relate to a method comprising tracking, via a counter of a welding device, a date, a time, or a welding parameter since the welding device last received a heartbeat signal from a welding asset tracking system, determining whether a first threshold has been reached based on the date, time, or welding parameter being tracked, and in response to determining the first threshold has been reached, putting the welding device in an expiration state.

In some examples, the expiration state comprises a disabled state, a sleep state, a standby state, or a warning message state. In some examples, the first threshold comprises an expiration date, an expiration time limit, or an expiration welding parameter limit. In some examples, the welding parameter comprises a number of welding arcs, an arc time, an expended welding energy, a consumable usage, an engine running time, or a fan on time. In some examples, the expiration state comprises a disabled state, a sleep state, or a standby state, and the method further comprises determining whether a second threshold has been reached based on the date, time, or welding parameter being tracked, and in response to determining the second threshold has been reached, emit a warning of imminent deactivation.

In some examples, the method further comprises enabling, activating, or waking the welding device and resetting the counter, in response to receiving the heartbeat signal. In some examples, the method further comprises resetting the counter in response to receiving the heartbeat signal. In some examples, the method further comprises resetting the counter in response to receiving an administrative override via an operator interface of the welding device. In some examples, the welding device comprises a wire feeder, welding power supply, welding gun, grinder, helmet, or air-purifying respirator.

Some examples of the present disclosure relate to a method, comprising receiving, at a welding asset tracking server, welding asset data from a welding asset tracking network, determining whether the welding asset data satisfies the welding criteria, and in response to determining the welding asset data does not satisfy the welding criteria, sending a command signal from the welding asset tracking server to a heartbeat generator of the welding asset tracking network, the command signal being representative of a command to stop generating a heartbeat signal.

FIG. 1 shows an example of a welding asset tracking system 100. As shown, the welding asset tracking system 100 includes an asset tracking server 110, a local positioning system comprising one or more location beacons 120, and an asset tracking network comprising several welding assets 200 interconnected via one or more gateways 140, hubs 160, and/or tags 180. As shown, the gateway(s) 140, hub(s) 160, and/or tag(s) 180 are retained by the one or more welding assets 200. In some examples, one or more brackets, fasteners, housings, and/or other mechanisms may be used to retain the gateway(s) 140, hub(s) 160, and/or tag(s) 180 in and/or on the welding assets 200. In some examples, one or more mobile devices 104 (e.g., smartphones, tablet computers, laptop computers, etc.) configured for use with the welding asset tracking system 100 may also take on the role of a gateway 140. In some examples, one or more of the gateways 140, hubs 160, and/or tags 180 may not be retained by a welding asset 200.

Figure 2:
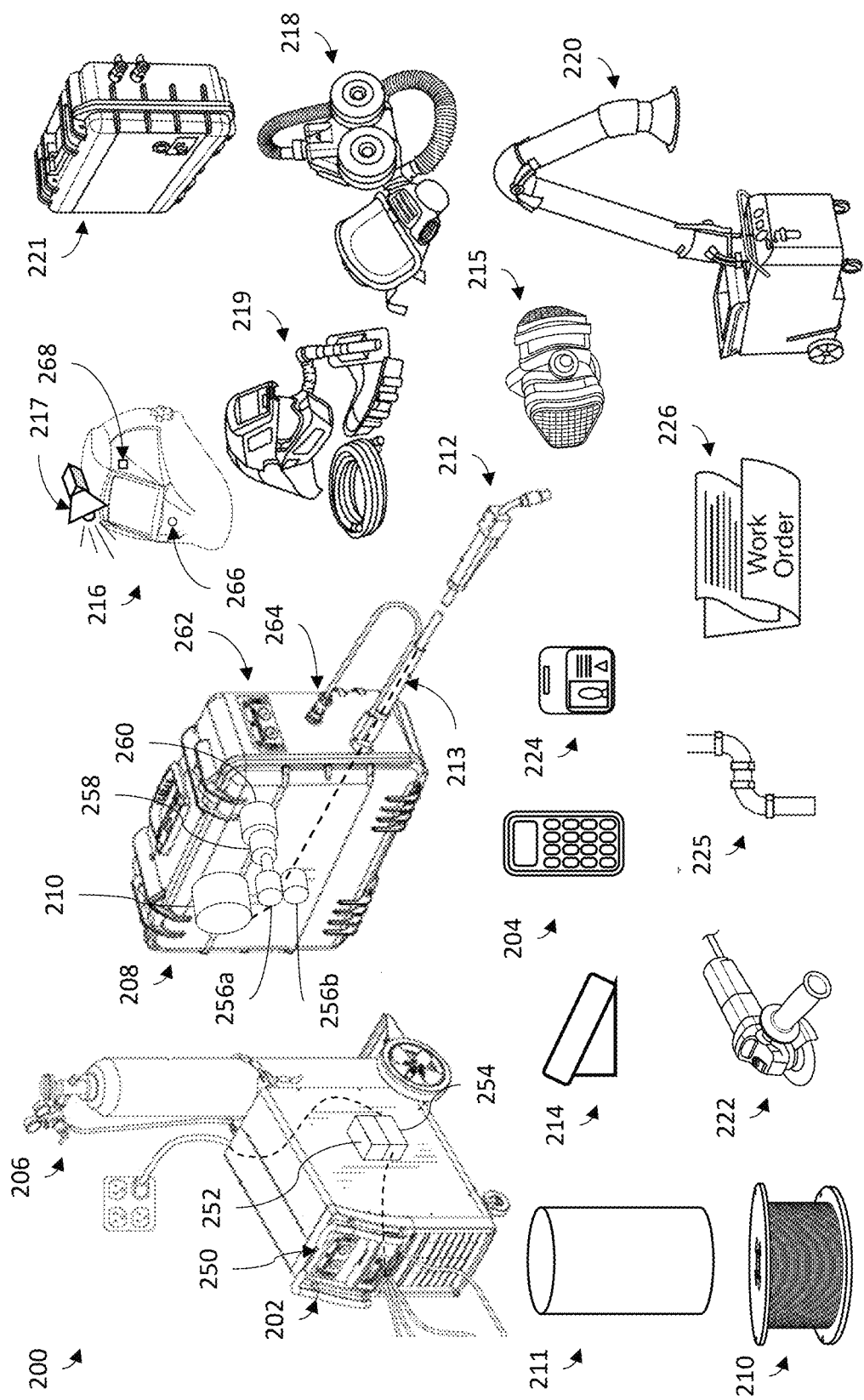
FIG. 2 shows examples of different welding assets that may be used with the welding asset tracking system of FIG. 1, in accordance with aspects of this disclosure.

A welding asset 200, as used herein, may refer to any device, equipment, accessory, and/or tool used for welding and/or welding-type activities (e.g., metal fabrication, induction heating, grinding, polishing, plasma cutting, etc.). FIG. 2 shows several common examples of welding assets 200 that may be used with the welding asset tracking system 100. As shown, common welding assets 200 may include a welding (and/or welding-type) power supply 202, a power supply pendant 204, a gas bottle regulator 206, a gas bottle 207, a welding wire feeder 208, a wire spool 210, a wire barrel 211, a welding torch 212, a foot pedal 214, a respirator mask 215, a welding helmet 216, a light 217 (e.g., attached to, or separate from, the welding helmet 216), a powered air-purifying respirator (PAPR) 218, a supplied air respirator (SAR) 219, a fume extractor 220 (e.g., to extract welding fumes), a box filtration system 221, a grinder 222, an operator id badge 224, welding material 225 (e.g., welding workpiece(s)), and a welding work order 226 (e.g., affixed to a bin or pallet containing welding material 225, or the welding material 225 itself). In some examples, the welding torch 212 may be a welding gun or plasma torch. In some examples, the welding torch 212 may be robot and/or machine operated.

One of the more important, complex, and/or expensive welding assets 200 is the welding power supply 202. In the example of FIG. 2, the welding power supply 202 includes a power supply interface 250, and power supply control circuitry 252 in electrical communication with power conversion circuitry 254. In some examples, the power supply interface 250 may also be in electrical communication with the power supply control circuitry 252. As shown, the power conversion circuitry 254 receives input power from a mains power source (e.g., electrical outlet). In some examples, the power conversion circuitry 254 may instead (or additionally) receive input power from an engine-generator of the welding power supply 202. In some examples, the power conversion circuitry 254 may be configured to convert the input power to output power (e.g., welding-type output power and/or auxiliary output power). In some examples, the power conversion circuitry 254 may output welding-type power (and/or auxiliary power) via output connections of the power supply 202. Thereby, the output power may be used by appropriate devices that are electrically coupled to the welding power supply 202. In some examples, the power supply control circuitry 252 may control the power conversion circuitry 254 to output welding-type power when the power supply 202 is enabled. In some examples, the power supply control circuitry 252 may control the power conversion circuitry 254 to cease outputting welding-type power when the power supply 202 is disabled.

Another important welding asset 200 is the welding wire feeder 208. In the example of FIG. 2, the welding wire feeder 208 retains a wire spool 210 (e.g., on a spindle) and includes wire feed rollers 256 configured to feed the wire from the wire spool 210 out of the welding wire feeder 208 (e.g., via one or more welding cables to the welding torch 212). As shown, one of the wire feed rollers 256a is coupled to a motor 258. In some examples, both wire feed rollers 256 may be coupled to the motor 258 (or multiple motors 258). As shown, the motor 258 is in electrical communication with feeder control circuitry 260. In the example of FIG. 2, the welding wire feeder 208 further includes a feeder interface 262.

In some examples, the feeder control circuitry 260 is configured to control the motor 258 to selectively drive rotation of the wire feed roller(s) 256 when the wire feeder 208 is enabled, so as to feed the wire. In some examples, the feeder control circuitry 260 may be in electrical communication with a torch trigger port 264 of the wire feeder 208 that is configured for connection to a torch signal cable in electrical communication with the welding torch 212. In some examples, the feeder control circuitry 260 may control the motor 258 to drive rotation of the wire feed roller(s) 256 in response to one or more signals received from the torch trigger port 264 when the wire feeder is enabled. In some examples, the wire feeder 208 may be further configured to send the one or more signals received from the torch cable (and/or one or more signals representative thereof) on to the welding power supply 202 when the wire feeder is enabled. In some examples, the feeder control circuitry 260 is configured to control the motor 258 to cease driving rotation of the wire feed roller(s) 256, so as to stop feeding of the wire, when the wire feeder is disabled. In some examples, the wire feeder 208 may not send the one or more signals received from the torch cable (and/or one or more signals representative thereof) on to the welding power supply 202 when the wire feeder is disabled.

Yet another important welding asset 200 is the welding helmet 216. In the example of FIG. 2, the welding helmet 216 includes a light sensor 266 and an auto-darkening lens 268. In some examples, the light sensor 266 may comprise an electromagnetic sensor rather than, or in addition to, a light sensor 266. In some examples, the auto-darkening lens 268 may be configured to selectively apply a "darkening" light filter when the light sensor 266 detects a threshold amount of light, such as might be indicative of a bright (and/or electromagnetic) welding arc. While only one light sensor 266 is shown in the example of FIG. 2, in some examples, the welding helmet 216 may include several light sensors 266. In some examples, a particular welding helmet 216 may be tied to a particular operator (as operators may rarely share or switch welding helmets 216), such that tracking and/or monitoring of a welding helmet 216 may be similar to tracking and/or monitoring of the operator.

In the example of FIG. 1, each welding asset 200 includes one or more sensors 106. In some examples, the one or more sensors 106 may be configured to continuously and/or periodically sense, detect, measure, and/or record sensor data relating to the operation(s) (and/or error(s)) of that particular welding asset 200. For example, a welding power supply 202 may have one or more sensors 106 configured to sense, detect, measure, and/or record an input, intermediate, and/or output current and/or voltage, an arc time, a cooling airflow amount, a cooling device (e.g., fan) on time, a weld start/stop time, and/or a total energy amount outputted. As another example, a wire feeder 208 may have one or more sensors 106 configured to sense, detect, measure, and/or record a wire feed speed, a motor current, motor voltage, a cooling airflow amount, a cooling device (e.g., fan) on time, roller torque, roller speed, and/or a total amount of filler material output. As another example, a gas regulator 206 may have one or more sensors 106 configured to sense, detect, measure, and/or record gas flow rate, gas temperature, gas mixture, and/or total gas output. As another example, a welding helmet 216 may have one or more sensors 106 configured to sense, detect, measure, and/or record temperature in and/or around the welding helmet 216, air quality in and/or around the welding helmet 216, motion of the welding helmet 216, whether the helmet 216 is in a darkened state (e.g., for auto-darkening helmets), and/or the total amount of time spent in the darkened state (and/or undarkened state). As another example, a welding torch 212 may have one or more sensors 106 configured to sense, detect, measure, and/or record trigger activation start/stop time, activation duration, arc time, position (e.g., with respect to welding material 225 and/or a fixture), orientation (e.g., with respect to welding material 225 and/or a fixture), motion (e.g., with respect to welding material 225 and/or a fixture), current, and/or voltage. As another example, a foot pedal 214 may have one or more sensors 106 configured to sense, detect, measure, and/or record pedal activation start/stop time, activation duration, and/or activation pressure. As another example, a pendant 204 may have one or more sensors 106 configured to sense, detect, measure, and/or record a recent command history. As another example, an operator badge 224 may have one or more sensors 106 configured to sense, detect, measure, and/or record a scanning history (e.g., where the badge is scanned when entering/exiting certain areas and/or using certain assets). As another example, a PAPR 218 or fume extractor 220 may have one or more sensors 106 configured to sense, detect, measure, and/or record air circulation amounts, air quality, air temperature, and/or a condition of a filter.

In some examples, the one or more sensors 106 may detect and/or record a time corresponding to the sensing, detection, measurement, and/or recording of the sensor data. In some examples, one or more of the welding assets 200 may have no sensor 106. In some examples, a stand-alone sensor 106 configured to be removably attached to some third party (e.g., competitor) welding asset may be considered a welding asset 200 in and of itself. For example, a Hall Effect sensor or magnetic reed switch sensor configured to be attached to a welding cable and/or detect current through the welding cable may be fitted with its own tag 180, effectively making the sensor 106 itself a welding asset 200. As another example, an air flow sensor configured to be attached to a welding power supply 202 (e.g., within the interior and/or in fluid communication with external vents) may be configured to detect cooling air circulating through the welding power supply 202 and fitted with its own tag 180, effectively making the sensor 106 itself a welding asset 200.

In the example of FIG. 1, each sensor 106 has an electrical and/or communication link to a tag 180, hub 160, and/or gateway 140 retained by a welding asset 200. Through this link, sensor data sensed, detected, measured, and/or recorded by the sensor may be communicated to the tag 180, hub 160, and/or gateway 140 retained by the welding asset 200. As shown, the tag 180, hub 160, and gateway 140 have tag memory circuitry 182, hub memory circuitry 162, and gateway memory circuitry 142, respectively, configured to store the sensor data. In some examples, the tag memory circuitry 182, hub memory circuitry 162, and/or gateway memory circuitry 142 may also store a time corresponding to the detection, measurement, recordation, and/or reception of the sensor data. In some examples, the tag memory circuitry 182, hub memory circuitry 162, and/or gateway memory circuitry 142 may also store some other data related to the welding asset 200. The tag memory circuitry 182, hub memory circuitry 162, and/or gateway memory circuitry 142 may also store an identifier (e.g., serial number) that is unique within the welding asset tracking system 100 and/or associated with the welding asset 200 retaining the tag 180, hub 160, or gateway 140 (and/or associated with the tag 180, hub 160, or gateway 140 itself).

In some examples, smaller and/or less sophisticated welding assets 200*c* (e.g., wire spools 210, work orders 226, welding material 225, operator badges 224, welding guns 212, grinders 222, welding helmets 216, etc.), and/or welding assets 200*c* that change location frequently, may retain tags 180. In some examples, the tags 180 may be relatively cheap and/or simple devices and/or mechanisms. In the example of FIG. 1, the tag 180 includes tag communication circuitry 184 and tag memory circuitry 182 in electrical communication with one another. As discussed above, the tag memory circuitry 182 may store sensor data, one or more identifiers, and/or other data related to the retaining welding asset 200*c*. The tag communication circuitry 184 may be configured for shorter range communication, such as, for example, via a short wavelength ultra-high frequency protocol (commonly referred to as Bluetooth), an IEEE 802.15.4 standard protocol (commonly referred to as Zigbee), a near field communication (NFC) protocol, and/or a radio frequency identification (RFID) protocol. In some examples, the tag communication circuitry 184 may communicate data (i.e., tag data) stored in the tag memory circuitry 182 via the tag communication circuitry 184.

In some examples, a tag 180 may be so simple as to have no circuitry. For example, a simple welding asset 200 (e.g., wire spool) with no sensor 106 may record no dynamic data and/or have no need of dynamically updatable memory circuitry. In such an example, a tag 180 may be implemented via a (e.g., linear and/or one dimensional) barcode 186 or matrix (and/or two dimensional) barcode 188. In some examples, the tag 180 (and/or barcode 186 or matrix barcode 188) may be retained on an outside of the welding asset 200*a* or within a housing, chassis, cover, etc. of the welding asset 200*a*.

In some examples, moderately sized and/or moderately sophisticated welding assets 200*b* (e.g., welding helmets 216, wire feeders 208, power supplies 202), and/or welding assets 200 that only change locations occasionally, may retain hubs 160. In some examples, the hubs 160 may be retained on an outside of welding assets 200*b* or within a housing, chassis, cover, etc. of the welding assets 200*b*. In some examples, the hub retaining welding assets 200*b* may have existing circuitry (e.g., memory, control, and/or communication circuitry) that can be supplemented relatively easily and/or cheaply to give the welding assets 200*b* capabilities of a hub 160. As shown, the hub retaining welding asset(s) 200*b* include an asset interface 201*b*.

In the example of FIG. 1, the hub 160 includes hub memory circuitry 162, hub control circuitry 166, hub counter circuitry 161, and hub communication circuitry 164, in electrical communication with one another. In addition to identifiers and/or sensor data, the hub memory circuitry 162 is shown storing a hub tracking program 400 that guides the hub 160 in fulfilling its role in the welding asset tracking system 100, as discussed further below. In the example of FIG. 1, the hub memory circuitry 162 further stores a hub heartbeat program 500 that instructs the hub 160 in enforcing the heartbeat protocols of the welding asset tracking system 100, as discussed further below. The hub control circuitry 166 controls the operation of the hub 160 in accordance with the hub tracking program 400 and/or hub heartbeat program 500. In some examples, the hub control circuitry 166 may comprise one or more processors. In some examples, the asset interface 201*b* may be in electrical communication with the hub memory circuitry 162, hub control circuitry 166, hub counter circuitry 161, and/or hub communication circuitry 164, and/or may be used to manually control one or more aspects thereof.

In the example of FIG. 1, the hub communication circuitry 164 includes short range hub communication circuitry 163. In some examples, the short range hub communication circuitry 163 may be configured for shorter range wireless communication, such as, for example, via a short wavelength ultra-high frequency protocol (commonly referred to as Bluetooth), an IEEE 802.15.4 standard protocol (commonly referred to as Zigbee), an NFC protocol, and/or an RFID protocol. In some examples, the hub 160 may obtain tag data from nearby tags 180 (and/or their tag communication circuitry 184 and/or tag memory circuitry 182) in communication range using the short range hub communication circuitry 163. In some examples, a hub 160 may be configured to only communicate with and/or obtain tag data from certain acceptable tags 180, acceptable welding assets 200, and/or acceptable types of welding assets 200 (e.g., based on identifier(s)). In some examples, the hub tracking program 400 may include hub tracking criteria that specifies the acceptable tags 180, welding assets 200, and/or types of welding assets 200.

In the example of FIG. 1, the hub 160 is linked to a barcode scanner 168 configured to obtain tag data from a barcode 186 and/or matrix barcode 188. In some examples, the hub 160 may use the barcode scanner 168 instead of, or in addition to, the short range hub communication circuitry 163 to obtain tag data. For example, a wire feeder 208 (comprising a welding asset 200*b*) may have a barcode scanner 168 positioned and/or configured to scan a barcode 186 or matrix barcode 188 imprinted on an outer portion of a wire spool 210 when the wire spool 210 is loaded into the wire feeder 208. In some examples, the hub 160 may store the tag data (as well as a corresponding time the tag data is sent and/or received) in hub memory circuitry 162.

In the example of FIG. 1, the hub communication circuitry 164 also includes long range hub communication circuitry 165. In some examples, the long range hub communication circuitry 165 may be configured for longer range wireless communications, such as, for example, via a cellular and/or IEEE 802.11 standard (commonly referred to as WiFi) protocol. As shown, the hub 160 may be in communication with one or more gateways 140 of the welding asset tracking system 100 via the long range hub communication circuitry 165. In some examples, the hub 160 may send tag data obtained from nearby tags 180 to one or more gateways 140 in communication with the hub 160 via the long range hub communication circuitry 165. In some examples, the hub 160 may additionally, or alternatively, send an identifier of the welding asset 200b (and/or hub 160), sensor data from the sensor 106b, and/or other data relating to the welding asset 200b to one or more gateways 140 in communication with the hub 160 via the long range hub communication circuitry 165. Collectively, this data may be referred to as hub data.

In some examples, the hub 160 may send tag data and/or hub data directly to the asset tracking server 110 via the long range hub communication circuitry 165. In some examples, the hub 160 may send the tag data and/or hub data to a second hub 160 of the welding asset tracking system 100, such as, for example, if the hub communication circuitry 164 is unable to establish communication with a gateway 140 and/or the asset tracking server 110. In such an example, the second hub 160 may either be in communication with a gateway 140 (in which case tag data and/or hub data may be sent to the gateway 140) or also unable to establish communication with a gateway 140. If the second hub 160 is also unable to establish communication with a gateway 140, the tag data and/or hub data may be forwarded to a third hub 160 (and so on and so on until the data arrives at a hub 160 in communication with a gateway 140). In some examples, the hub 160 may be configured to only communicate with certain acceptable hubs 160 and/or certain acceptable gateways 140. In some examples, the hub tracking program 400 may include hub tracking criteria that identifies the acceptable hubs 160 and/or gateways 140.

In some examples, one or more hubs 160 may comprise one or more heartbeat receivers configured to receive one or more heartbeat signals from one or more heartbeat generators via the hub communication circuitry 164 (e.g., long range and/or short range). For example, a gateway 140 may operate as a heartbeat generator and send the hub(s) 160 one or more heartbeat signals, which the hub(s) 160 may receive via the hub communication circuitry 164. In some examples, the hub(s) 160 may only consider heartbeat signals having one or more acceptable heartbeat characteristics (e.g., within a particular frequency range, having a particular encoding, representative of a particular identifier, password, key, etc.) and/or received from one or more acceptable heartbeat generators, and ignore all other heartbeat signals.

In some examples, one or more hubs 160 may act as a heartbeat generator, and send one or more heartbeat signals to one or more heartbeat receiving gateways 140 and/or other hubs 160 via the hub communication circuitry 164. In some examples, the hub(s) 160 may be configured to format heartbeat signals specifically for one or more acceptable heartbeat receivers (e.g., hubs 160, gateways 140, welding assets 200, and/or specific types of welding assets 200). In some examples, the heartbeat signal(s) generated by the hub(s) 160 may be generated according to one or more acceptable heartbeat characteristics (e.g., frequency range, encoding, passwords, keys, identifiers, reset value(s) etc.). In some examples, the hub memory circuitry 162 may store one or more dates and/or times when the one or more heartbeat signals are generated and/or received.

In some examples, the hub heartbeat program 500 may govern the sending and/or acceptance of heartbeat signals, and/or what happens if no heartbeat signal is received. In some examples, the hub heartbeat program 500 may include hub heartbeat criteria that specifies a hub heartbeat status (e.g., whether the hub 160 should act as a heartbeat generator and/or receiver), acceptable heartbeat generators, acceptable heartbeat receivers, and/or acceptable heartbeat characteristics. In some examples, the hub heartbeat criteria may be input and/or modified through the hub heartbeat program 500, an asset interface 201b of the hub retaining welding asset 200b, an interface of the hub 160, and/or a device (e.g., a mobile device 104) in communication with the hub 160. In some examples, the hub tracking criteria may be used as hub heartbeat criteria, with the acceptable hubs 160 and/or gateways 140 comprising the acceptable heartbeat receivers and/or generators.

In the example of FIG. 1, the one or more hubs 160 include hub counter circuitry 161. In some examples, the hub counter circuitry 161 may comprise circuitry configured to output one or more signals representative of a value (e.g., time, date, welding parameter). In some examples, the hub counter circuitry 161 may also store the value in some (transitory and/or non-transitory) memory of the hub counter circuitry 161, hub control circuitry 166, and/or hub memory circuitry 162. While shown on its own in the example of FIG. 1, in some examples, the hub counter circuitry 161 may be part of the hub control circuitry 166.

In some examples, the hub counter circuitry 161 may be configured to sequentially increase or decrease a stored and/or outputted value, such as, for example, in response to one or more input signals. For example, the hub counter circuitry 161 may be configured to count time (e.g., seconds, minutes, hours, etc.) by sequentially increasing or decreasing a time value in response to a clock input signal (e.g., from clock circuitry of the hub control circuitry 166 and/or hub counter circuitry 161). As another example, the hub counter circuitry 161 may be configured to count dates (e.g., calendar dates and/or days) by sequentially increasing or decreasing a date value in response to a date input signal (e.g., received once every twenty four hours). In some examples, the date input signal may be provided by clock circuitry, some logic circuitry that interprets one or more signals from the clock circuitry, and/or some other (e.g., time counting) hub counter circuitry 161. As another example, the hub counter circuitry 161 may be configured to count one or more welding parameters (e.g., a number of welding arcs, an arc time, an expended welding energy, a consumable usage, an engine running time, a fan on time, etc.) in response to a parameter input signal. In some examples, such a parameter input signal may be provided by one or more hub sensors 106b and/or some circuitry (e.g., hub control circuitry 166) configured to interpret one or more outputs of the hub sensor(s) 106b. In some examples, one or more hub sensors 106b may be part of the hub counter circuitry 161, or vice versa.

In some examples, the hub control circuitry 166 (e.g., acting in view of the hub heartbeat program 500) may compare the value (and/or representative signal) outputted by the hub counter circuitry 161 to one or more thresholds stored in hub memory circuitry 162. In some examples, the one or more thresholds may be stored as part of the hub heartbeat program 500. In some examples, the hub control circuitry 166 may further take some action (e.g., issue an alert, disable the asset 200, etc.) based on that comparison (e.g., if the value is greater than, equal to, or less than the one or more thresholds). In some examples, the hub counter circuitry 161 may reset its output value to zero or to some other value (e.g., set forth in heartbeat signal) if and/or when the hub 160 receives a valid heartbeat signal.

In the example of FIG. 1, the gateway 140 is retained by a welding asset 200a. In some examples, larger and/or more sophisticated welding assets 200a (e.g., wire feeders 208, power supplies 202, etc.), and/or welding assets 200a that rarely change location significantly, may retain gateways 140. In some examples, the gateways 140 may be more sophisticated and/or expensive devices. Nevertheless, in some examples, the welding assets 200a may have existing circuitry that can be supplemented relatively easily and/or cheaply to give the welding asset 200a gateway capabilities. As shown, the gateway retaining welding asset(s) 200a include an asset interface 201a.

In the example of FIG. 1, each gateway 140 includes gateway memory circuitry 142, gateway control circuitry 146, gateway counter circuitry 141, and gateway communication circuitry 144 in electrical communication with one another. In addition to identifiers and/or sensor data, the gateway memory circuitry 142 stores a gateway tracking program 401 that guides the gateway 140 in fulfilling its role in the welding asset tracking system 100, as discussed further below. In the example of FIG. 1, the gateway memory circuitry 142 further stores a gateway heartbeat program 501 that instructs the gateway 140 in enforcing the heartbeat protocols of the welding asset tracking system 100, as discussed further below. The gateway control circuitry 146 controls the operation of the gateway 140 in accordance with the gateway tracking program 401 and/or gateway heartbeat program 501. In some examples, the gateway control circuitry 146 may comprise one or more processors. In some examples, the asset interface 201a may be in electrical communication with the gateway memory circuitry 142, gateway control circuitry 146, gateway counter circuitry 141, and/or gateway communication circuitry 144, and/or may be used to manually control one or more aspects thereof.

In the example of FIG. 1, the gateway communication circuitry 144 includes short range gateway communication circuitry 143. In some examples, the short range gateway communication circuitry 143 may be configured for shorter range wireless communication, such as, for example, via a short wavelength ultra-high frequency protocol (commonly referred to as Bluetooth), an IEEE 802.15.4 standard protocol (commonly referred to as Zigbee), an NFC protocol, and/or an RFID protocol. In some examples, the gateway 140 may obtain tag data from nearby tags 180 and/or hub data from nearby hubs 160 (in communication range using the short range gateway communication circuitry 143. Though not shown, in some examples, the gateway 140 may be linked to a barcode scanner 168 and obtain tag data from a barcode 186 and/or matrix barcode 188 using the barcode scanner 168. In some examples, the gateway 140 may store the tag data and/or hub data (as well as a corresponding time the tag/hub data is sent and/or received) in gateway memory circuitry 142.

In the example of FIG. 1, the gateway communication circuitry 144 also includes long range gateway communication circuitry 145. In some examples, the long range gateway communication circuitry 145 may be configured for longer range wireless communications, such as, for example, via a cellular and/or IEEE 802.11 standard (commonly referred to as WiFi) protocol. As shown, the gateway 140 may be in communication with one or more hubs 160 of the welding asset tracking system 100 via the long range gateway communication circuitry 145. In some examples, the gateway 140 may receive hub data (and/or asset identifiers, sensor data, timestamps, etc.) obtained from nearby hubs 160 via the long range gateway communication circuitry 145. In some examples, the gateway 140 may also communicate with other gateways 140 of the welding asset tracking system 100 via the gateway communication circuitry 144 (long and/or short range). In some examples, the gateway 140 may be configured to only communicate with certain acceptable hubs 160 and/or certain acceptable gateways 140. In some examples, the gateway tracking program 401 may include hub tracking criteria that identifies the acceptable hubs 160 and/or gateways 140.

In some examples, one or more gateways 140 may comprise heartbeat receivers configured to obtain and/or receive one or more heartbeat signals from one or more nearby heartbeat generators via the gateway communication circuitry 144 (e.g., long range and/or short range). For example, a hub 160 or a different gateway 140 may operate as a heartbeat generator and send the gateway 140 one or more heartbeat signals, which the gateway 140 may receive via the gateway communication circuitry 144. In some examples, the gateway 140 may only consider heartbeat signals having one or more acceptable heartbeat characteristics (e.g., within a particular frequency range, having a particular encoding, representative of a particular identifier, password, key, etc.) and/or received from one or more acceptable heartbeat generators, and ignore all other heartbeat signals.

In some examples, one or more gateways 140 may act as heartbeat generators and send and/or deliver one or more heartbeat signals to one or more nearby gateways 140 and/or hubs 160 via the gateway communication circuitry 144. In some examples, the gateway(s) 140 may be configured to format heartbeat signals specifically for one or more acceptable heartbeat receivers (e.g., hubs 160, gateways 140, welding assets 200, and/or specific types of welding assets 200). In some examples, the heartbeat signals generated by the gateway(s) 140 may be generated according to one or more acceptable heartbeat characteristics (e.g., frequency range, encoding, passwords, keys, identifiers, reset value(s), etc.). In some examples, the gateway memory circuitry 142 may store one or more dates and/or times when the one or more heartbeat signals are generated and/or received.

In some examples, the gateway heartbeat program 501 may govern the sending and/or acceptance of heartbeat signals, and/or what happens if no heartbeat signal is received. In some examples, the gateway heartbeat program 501 may include gateway heartbeat criteria that specifies a gateway heartbeat status (e.g., whether the gateway 140 should act as a heartbeat generator and/or receiver), acceptable heartbeat generators, acceptable heartbeat receivers, and/or acceptable heartbeat characteristics. In some examples, the gateway heartbeat criteria may be input and/or modified through the gateway heartbeat program 501, an interface of the gateway retaining welding asset 200a, an interface of the gateway 140, and/or a device (e.g., a mobile device 104) in communication with the gateway 140. In some examples, the gateway tracking criteria may be used as gateway heartbeat criteria, with the acceptable hubs 160 and/or gateways 140 comprising the acceptable heartbeat receivers and/or generators.

In the example of FIG. 1, the one or more gateways 140 include gateway counter circuitry 141. In some examples, the gateway counter circuitry 141 may comprise circuitry configured to output one or more signals representative of a value (e.g., time, date, welding parameter). In some examples, the gateway counter circuitry 141 may also store the value in some (transitory and/or non-transitory) memory of the gateway counter circuitry 141, gateway control circuitry 146, and/or gateway memory circuitry 142. While shown on its own in the example of FIG. 1, in some examples, the gateway counter circuitry 141 may be part of the gateway control circuitry 146.

In some examples, the gateway counter circuitry 141 may be configured to sequentially increase or decrease a stored and/or outputted value, such as, for example, in response to one or more input signals. For example, the gateway counter circuitry 141 may be configured to count time (e.g., seconds, minutes, hours, etc.) by sequentially increasing or decreasing a time value in response to a clock input signal (e.g., from clock circuitry of the gateway control circuitry 146 and/or gateway counter circuitry 141). As another example, the gateway counter circuitry 141 may be configured to count dates (e.g., calendar dates and/or days) by sequentially increasing or decreasing a date value in response to a date input signal (e.g., received once every twenty four hours). In some examples, the date input signal may be provided by clock circuitry, some logic circuitry that interprets one or more signals from the clock circuitry, and/or some other (e.g., time counting) gateway counter circuitry 141. As another example, the gateway counter circuitry 141 may be configured to count one or more welding parameters (e.g., a number of welding arcs, an arc time, an expended welding energy, a consumable usage, an engine running time, a fan on time, etc.) in response to a parameter input signal. In some examples, such a parameter input signal may be provided by one or more gateway sensors 106a and/or some circuitry (e.g., gateway control circuitry 146) configured to interpret one or more outputs of the gateway sensor(s) 106a. In some examples, one or more gateway sensors 106a may be part of the gateway counter circuitry 141, or vice versa.

In some examples, the gateway control circuitry 146 (e.g., acting in view of the gateway heartbeat program 501) may compare the value (and/or representative signal) outputted by the gateway counter circuitry 141 to one or more thresholds stored in gateway memory circuitry 142. In some examples, the one or more thresholds may be stored as part of the hub heartbeat program 500. In some examples, the gateway control circuitry 146 may further take some action (e.g., issue an alert, disable the asset 200, etc.) based on that comparison (e.g., if the value is greater than, equal to, or less than the one or more thresholds). In some examples, the gateway counter circuitry 141 may reset its output value to zero or to some other value (e.g., set forth in heartbeat signal) if and/or when the gateway 160 receives a valid heartbeat signal.

In the example of FIG. 1, the gateway 140 also includes global positioning system (GPS) communication circuitry 147. As shown, the gateway 140 is in communication with an external positioning system 108 (e.g., GPS, Wifi, and/or cellular positioning system). In some examples, the GPS communication circuitry 147 may enable communication with the external positioning system 108. In some examples, the external positioning system 108 may provide the gateway 140 with a position (e.g., latitude and/or longitude) of the gateway 140 and/or retaining welding asset 200a via the external positioning system 108 and/or GPS communication circuitry 147. In some examples, one or more hubs 160 may also have GPS communication circuitry 147 (and/or other appropriate communication circuitry) with which to communicate with, and/or obtain position information from, the external positioning system 108.

In the example of FIG. 1, the hubs 160 are in communication (e.g., via short range hub communication circuitry 163) with a local positioning system comprising one or more location beacons 120. In some examples, the gateways 140 may also be in communication (e.g., via short range gateway communication circuitry 143) with the local positioning system. In some examples, the local positioning system may be used to estimate and/or determine a (relative, local, and/or global) position of a gateway 140, hub 160, tag 180, and/or welding asset 200, such as, for example, in situations where the external positioning system 108 is unavailable, unreachable, and/or otherwise not an option. In some examples, multiple location beacons 120 may be positioned throughout a welding area to provide a dense, granular, and/or more precise local positioning system. In some examples, one or more of the location beacons 120 may also operate as a heartbeat generator.

In the example of FIG. 1, the one or more location beacons 120 of the local positioning system each include beacon memory circuitry 122, beacon communication circuitry 124, and a beacon user interface (UI) 126 in electrical communication with one another. As shown, the beacon memory circuitry 122 stores a location 128 of the beacon 120, as a well as beacon heartbeat criteria 129. In some examples, the beacon location 128 may be a relative position (e.g., 100 feet NW of beacon 2, halfway between front door and western window, etc.), a local position (e.g., welding cell 5, back door, front wall, loading bay, etc.), and/or a global position (e.g., 41.8823° N, 87.6404° W). In some examples, the beacon heartbeat criteria 129 may comprise a beacon heartbeat status (e.g., whether the beacon 120 should act as a heartbeat generator), acceptable heartbeat receivers, and/or acceptable heartbeat characteristics (e.g., frequency range, encoding, passwords, keys, identifiers, reset value(s), etc.).

In some examples, the beacon location 128 and/or beacon heartbeat criteria 129 may be entered and/or modified via the beacon UI 126. In some examples, the beacon location 128 and/or beacon heartbeat criteria 129 may be entered and/or modified via a third party device (e.g., mobile device 104) in communication with the location beacon 120 (e.g., via beacon communication circuitry 124). In some examples, the beacon location 128 may be communicated to hubs 160 and/or gateways 140 in communication range via beacon communication circuitry 124. In some examples, one or more heartbeat signals may be generated by the location beacon 120 according to one or more acceptable heartbeat characteristics when the beacon heartbeat criteria 129 indicates that the beacon 120 should act as a heartbeat generator. In some examples, the one or more heartbeat signals may be specifically formatted for the acceptable heartbeat receivers identified by the beacon heartbeat criteria 129. In some examples, the one or more heartbeat signals may be broadcast to any hub 160 and/or gateway 140 within range of the beacon communication circuitry 124.

In some examples, a maximum communication range of the beacon communication circuitry 124 may be reduced to a set communication range. This reduction may be achieved via beacon UI 126 and/or third party device in communication with the beacon communication circuitry 124, for example. In some examples, the maximum communication range and/or set communication range may be stored in the beacon memory circuitry 122, and/or accessed when determining position.

In some examples, the hubs 160 and/or gateways 140 of the welding asset tracking system 100 may determine their positions via the external positioning system 108 and/or local positioning system. For example, a gateway 140 in communication with the external positioning system 108 may determine its global position via GPS communication circuitry 147, and send this position to the asset tracking server(s) 110. Thereafter, the asset tracking server 110 (and/or the gateway 140 itself) may determine and/or estimate a position of any gateways 140, hubs 160, and/or tags 180 for which the gateway 140 has obtained (and/or communicated) data. As another example, a hub 160 that cannot access the external positioning system 108 may nonetheless access one or more location beacons 120 of the local positioning system and thereby estimate and/or determine its position based on the beacon locations 128 of the location beacons 120. Thereafter, the asset tracking server 110 (and/or hub 160 itself or some gateway 140) may determine and/or estimate a position of any hubs 160 and/or tags 180 for which the hub 160 has obtained (and/or communicated) data.

In some examples, the determination and/or estimation of position may include a position radius and/or a zone of uncertainty (e.g., position within 50 meters of gateway 12, or somewhere within facility 13). In some examples, the position determination and/or estimation may be made more accurate and/or precise by using multiple location beacons 120 in combination with trilateration and/or triangulation methods. In some examples, the position determination and/or estimation may be made more accurate and/or precise by using other factors (e.g., the communication range, signal strength, signal time of flight, signal direction, etc.). In some examples, the gateway(s) 140 and/or hub(s) 160 may be configured with a plurality of antennas (e.g., 2, 3, 4, etc.) to facilitate detection of signal direction (e.g., by determining which antenna(s) first receive the signal). In some examples, the position information of the external positioning system 108 and local positioning system may be combine to more accurately and/or precisely determine position.

In some examples, one or more gateways 140, hubs 160, tags 180, and/or sensors 106 may have their position stored in their own respective memory circuitry, so that position may be determined without resorting to an external positioning system. In some examples, the gateways 140, hubs 160, tags 180, and/or sensors 106 may also be setup, updated, paired, and/or otherwise configured with position information (and/or other information) via a third party device (e.g., mobile device 104) in communication with the gateway 140, hub 160, tag 180, and/or sensor 106. In some examples, the gateways 140, hubs 160, tags 180, and/or sensors 106 retained by welding assets 200 may be setup, paired, and/or otherwise configured via an interface of the retaining welding asset 200.

In the example of FIG. 1, the gateway 140 is also in communication with one or more asset tracking server(s) 110 through a network 101 (e.g., local area network, wide area network, internet, etc.). In some examples, the gateway 140 may be in communication with the asset tracking server(s) 110 directly, without going through the network 101. In some examples, the gateway communication circuitry 144 (e.g., the long range gateway communication circuitry 145) may be configured to facilitate communication with the asset tracking server(s) 110 and/or network 101. In some examples, the asset tracking server(s) 110 may be implemented in one or more gateways 140.

In some examples, the gateways 140 may send information obtained from other gateways 140, hubs 160, and/or tags 180 to the asset tracking server(s) 110. In some examples, one or more hubs 160 may also be in communication with the asset tracking server(s) 110, and/or send information obtained from other hubs 160, and/or tags 180 to the asset tracking server(s) 110 without going through the gateway(s) 140. In some examples, one or more mobile devices 104 configured for use with the welding asset tracking system 100 may also take on the role of gateways 140 and send information obtained from other gateways 140, hubs 160, and/or tags 180 to the asset tracking server(s) 110. For example, one or more welding operators, administrators, maintenance workers, technicians, etc. may carry mobile devices 104 configured to act as mobile gateways 140 with the welding asset tracking system 100. In such an example, the mobile gateways 140 may obtain location, hub, and/or tag data (and/or gateway data) when in proximity to location beacons 120, gateways 140, hubs 160, and/or tags, and send the data to the asset tracking server(s) 110.

In the example of FIG. 1, the one or more asset tracking servers 110 include server communication circuitry 114, server processing circuitry 116, and server memory circuitry 112 in electrical communication with one another. In some examples, only one asset tracking server 110 may be used. In some examples, multiple asset tracking servers 110 may be used. As shown, the one or more asset tracking servers 110 are in communication with one or more gateways 140 through the network 101. In some examples, the asset tracking server(s) 110 may be in communication with one or more hubs 160 as well. In some examples, the asset tracking server(s) 110 may be in communication with the one or more gateways 140 and/or hubs 160 directly, without going through the network 101. In some examples, the server communication circuitry 114 may facilitate communication with the network 101, gateways 140, and/or hubs 160.

In the example of FIG. 1, the server memory circuitry 112 stores an asset tracking database 118, an asset tracking program 403, and a server heartbeat program 600. In some examples, the asset tracking database 118 may store data obtained from the gateways 140, hubs 160, tags 180, and/or sensors 106 of the welding asset tracking system 100. In some examples, the asset tracking database 118 may be stored in the server memory circuitry 112 of one asset tracking server 110. In some examples, duplicates of the asset tracking database 118 may be stored across several asset tracking servers 110. In some examples, different portions of the asset tracking database 118 may be stored in several different asset tracking servers 110.

In some examples, certain data may be associated in the asset tracking database 118 to facilitate reporting, analysis, and/or tracking. For example, sensor data obtained from multiple sensors 106 of the same welding asset 200 may be linked and/or associated. As another example, data pertaining to the same welding assets 200, or welding assets 200 of the same or similar type, welding assets 200 at the same or similar location, welding assets 200 used by the same or similar operators, and/or welding assets 200 involved the same or similar operations, may be linked and/or associated. In some examples, the asset tracking server(s) 110 may facilitate the associations (e.g., via server processing circuitry 116). For example, the asset tracking server(s) 110 may automatically associate tag data, hub data, and/or gateway data with the hub and/or gateway data corresponding to the hub 160 and/or gateway 140 that sent the tag data, hub data, and/or gateway data to the asset tracking server(s) 110. As another example, the asset tracking server(s) 110 may automatically associate tag data (and/or hub or gateway data) with other tag data (and/or hub or gateway data) sent to the asset tracking server(s) 110 by the same hub 160 and/or gateway 140. As another example, the asset tracking server(s) 110 may automatically associate tag data (and/or hub or gateway data) with other tag data (and/or hub or gateway data) sent to the asset tracking server(s) 110 at the same or a similar time.

In some examples, the asset tracking server(s) 110 may automatically associate an operator (and/or operator identifier(s) and/or one or more welding assets 200 already associated with the operator) with one or more welding assets based on certain received data. For example, the asset tracking server(s) 110 may receive sensor data obtained from a sensor 106 (and/or light sensor 266) of a welding helmet 216 indicating a certain frequency of auto-darkening by the auto-darkening lens 268, and/or a certain frequency of bright light detection by the light sensor 266. Additionally, the asset tracking server(s) may receive sensor data obtained from a sensor 106 of a welding power supply 202 indicating a similar or identical frequency of arc starts, arc stops, and/or welding-type power output indicative of welding arcs. Based on this similarity, the asset tracking server(s) 110 may determine that the operator associated with the welding helmet 216 is using the welding power supply 202, and associate that welding power supply 202 (and/or corresponding data) with the operator and/or welding helmet 216 (and/or corresponding data). By automatically associating the operator(s) and/or welding asset(s) 200 together, the welding asset tracking system 100 may remove the need for manual association (e.g., via tracking criteria and/or heartbeat criteria) by a user or operator.

In the example of FIG. 1, the server memory circuitry 112 stores an asset tracking program 403. In some examples, the asset tracking program 403 may comprise computer (and/or processor) readable (and/or executable) instructions. In some examples, the server processing circuitry 116 may control the operation of the asset tracking server 110 in accordance with the asset tracking program 403. In some examples, the server processing circuitry 116 may comprise one or more processors.

In some examples, the asset tracking program 403 may direct the server processing circuitry 116 to organize and/or store data received via the asset tracking network in the asset tracking database 118. In some examples, the asset tracking program 403 may further direct the asset tracking server(s) 110 to parse and/or query the data in the asset tracking database 118, such as in response to one or more user requests (e.g., received from a terminal and/or other device in communication with the asset tracking server(s) 110). For example, the asset tracking server 110 may receive one or more requests to locate a particular welding asset, a particular welding asset type, welding assets in a particular location, welding assets performing a particular operation, welding assets used by a particular operator, etc. In response, the asset tracking server 110 may query and/or parse the data in asset tracking database 118 to respond to the request.

In the example of FIG. 1, the server memory circuitry 112 further stores a server heartbeat program 600. In some examples the server heartbeat program 600 may comprise computer (and/or processor) readable (and/or executable) instructions. In some examples, the server processing circuitry 116 may control the operation of the asset tracking server 110 in accordance with the server heartbeat program 600.

In some examples, the server heartbeat program 600 may direct the server processing circuitry 116 to control one or more aspects of the heartbeat generators of the welding asset tracking system 100 (e.g., via the asset tracking network). In some examples, the server heartbeat program 600 may disable one or more heartbeat generators and/or control one or more heartbeat generators to stop sending one or more heartbeat signals. For example, the server heartbeat program 600 may analyze certain data received via the asset tracking network and/or in the asset tracking database 118 in view of certain acceptable criteria (e.g., stored in server memory circuitry 112), and disable the heartbeat generator(s) and/or heartbeat signal(s) if the data does not meet the threshold(s) of the acceptable criteria. The server heartbeat program 600 is further discussed below with respect to FIG. 6.

Figure 3:
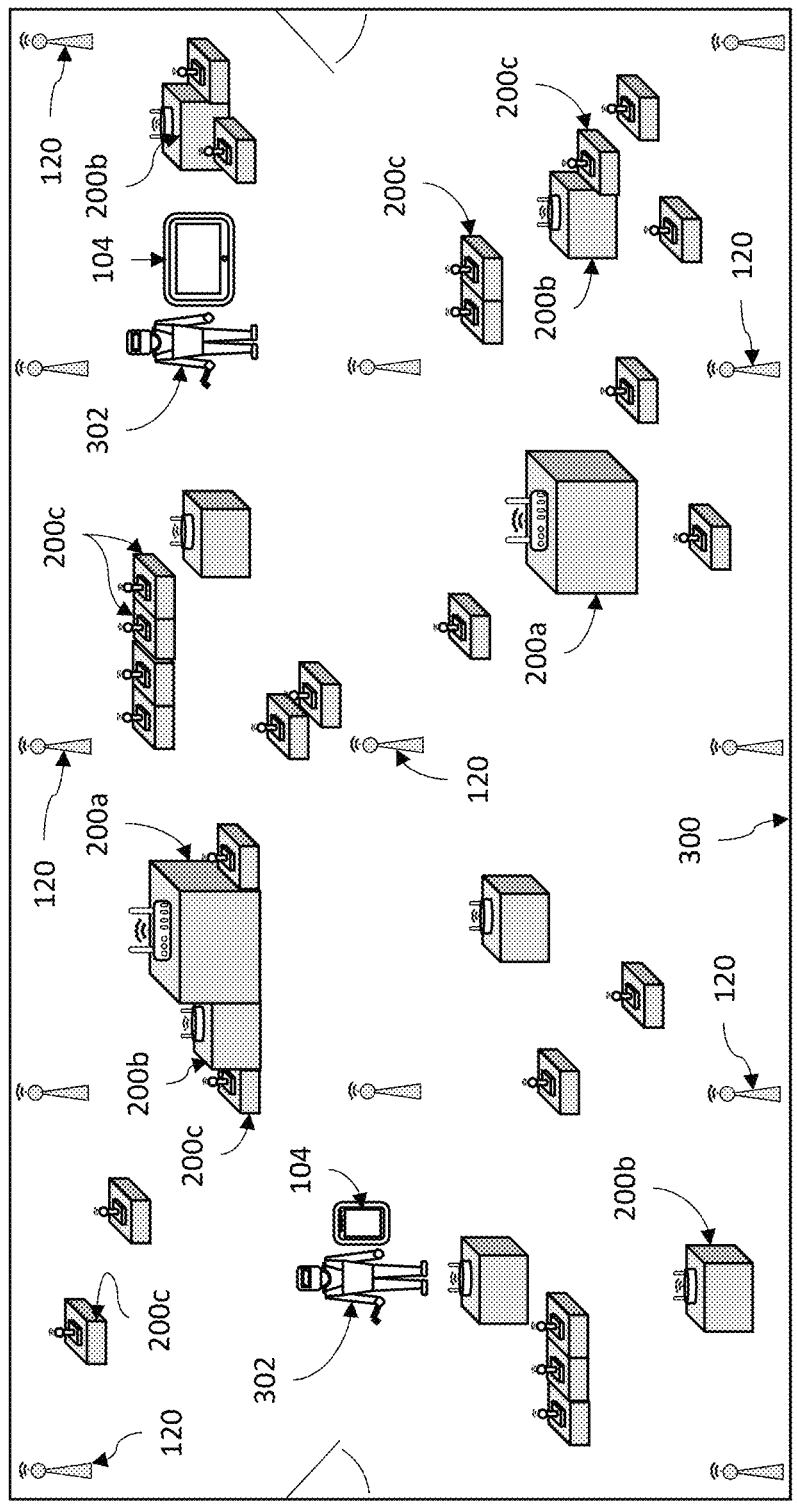
FIG. 3 is a diagram illustrating an example welding area with components of the welding asset tracking system of FIG. 1, in accordance with aspects of this disclosure.

FIG. 3 is a diagram illustrating components of the welding asset tracking system 100 distributed within an example welding area 300. As shown, several gateway retaining welding assets 200a, hub retaining welding assets 200b, and tag retaining welding assets 200c are positioned throughout the welding area 300. A plurality of location beacons 120 are also arranged in a grid like configuration within the welding area 300. In some examples, the grid like configuration may increase the likelihood that there will be at least one location beacon 120 nearby that can be used to determine position and/or supply heartbeat signal(s). Two welding operators 302 with mobile devices 104 that may operate as gateways 140 are also shown in the welding area 300.

In the example of FIG. 3, there are more tag retaining welding assets 200c than hub retaining welding assets 200b, and more hub retaining welding assets 200b than gateway retaining welding assets 200a. This may reflect a real world situation, and may help illustrate the economics of the welding asset tracking system 100. Using low cost tags 180 with the numerous tag retaining welding assets 200c may help to keep costs manageable. The fewer hub retaining welding assets 200b and gateway retaining welding assets 200a means that fewer pricey hubs 160 are used, and still fewer even pricier gateways 140.

Despite being fewer in number than the tag retaining welding assets 200c (and/or tags 180), the hub retaining welding assets 200b and gateway retaining welding assets 200a (and/or associated hubs 160 and gateways 140) nevertheless form a relatively dense asset tracking network. The majority of tag retaining welding assets 200c (and/or tags 180) are within close proximity to at least one hub retaining welding asset 200b or gateway retaining welding asset 200a. As shown, all the hub retaining welding assets 200b are in proximity to at least one hub retaining welding asset 200b or gateway retaining welding asset 200a. In examples where no gateway 140 is in proximity, a hub 160 may send its data to another hub 160 in proximity, and so on and so forth, until the data arrives at a gateway 140 (or a mobile device 104 or hub 160 with gateway capabilities). The density of the hubs 160 and gateways 140, as well as the mesh like network forwarding capabilities of the hubs 160, may help ensure that data can be relatively consistently collected and/or uploaded to the asset tracking server 110. Additionally, the density may ensure that the hubs 160 and/or gateways 140 that are heartbeat receivers (and/or require heartbeat signals) are within range of an acceptable heartbeat generator. Further, this density may be representative of real world situations, where often times multiple welding assets 200 are used in relatively close proximity to one another, and rarely is a welding asset 200 left isolated far from other welding assets 200. While the mobile devices 104 operating as gateways 140 may be valuable supplements, such as in those cases where one or more welding assets 200 are isolated, they are not a necessity. Thus, the system can still operate well even if operators 302 with mobile devices 104 are only rarely (or never) in the welding area 300.

Figure 4A:
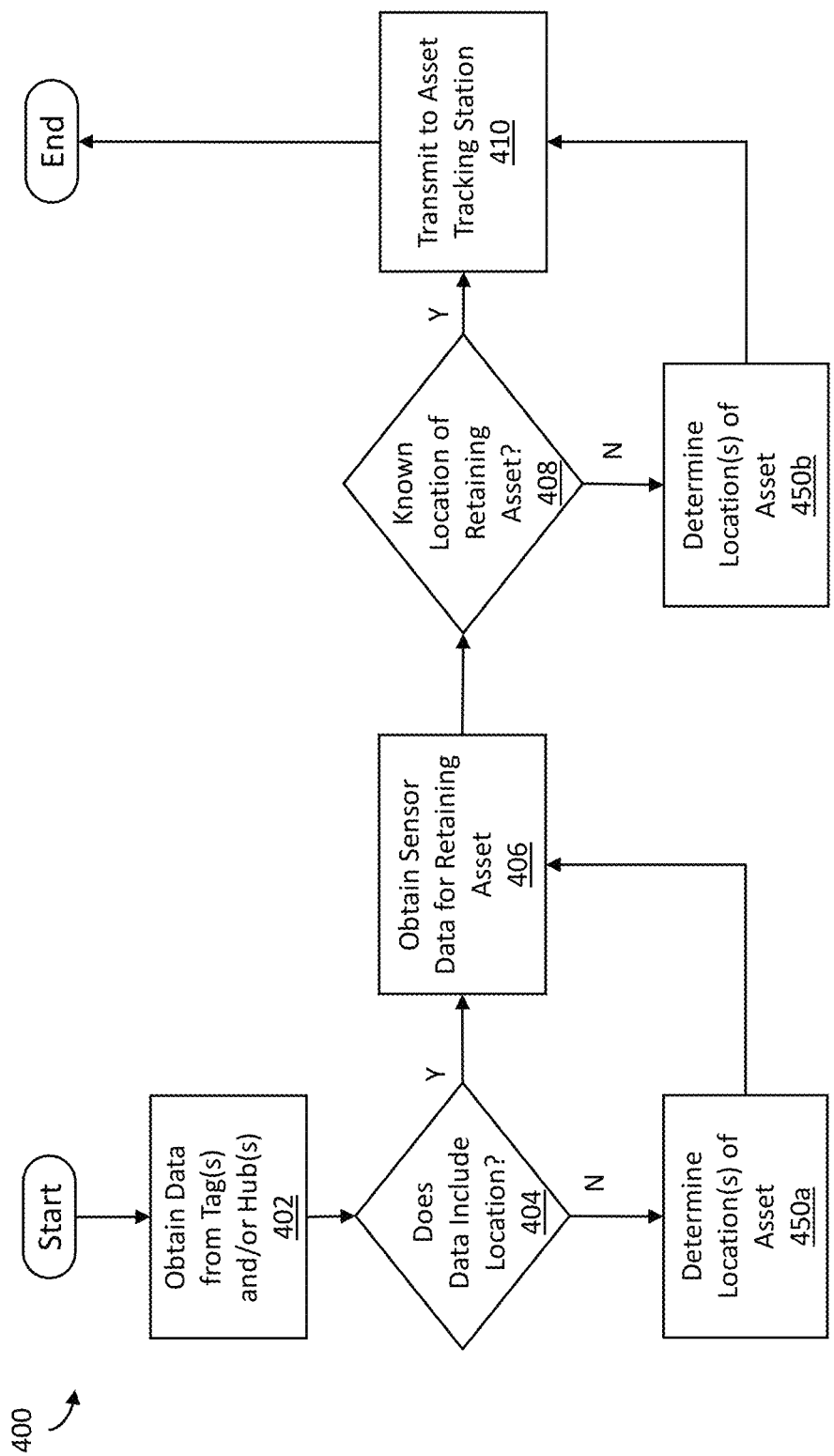
FIGS. 4a and 4b are flowcharts illustrating an example hub tracking program of the welding asset tracking system of FIG. 1, in accordance with aspects of this disclosure.

FIG. 4a is a flowchart illustrating an example hub tracking program 400 of the welding asset tracking system 100 of FIG. 1. In some examples, the hub tracking program 400 may be implemented in computer (and/or processor) readable (and/or executable) instructions. While shown as being stored in hub memory circuitry 162, in some examples, the hub tracking program 400 may be implemented in discrete analog and/or digital circuitry. While FIG. 4a is described in terms of the hub tracking program 400, in some examples, the gateway tracking program 401 may operate very similarly to the hub tracking program 400 (e.g., with respect to a gateway 140 and/or gateway retaining welding asset 200a instead of hub 160 and/or hub retaining welding asset 200b). In some examples, portions of the hub tracking program 400 may also be performed by the asset tracking program 403.

In the example of FIG. 4a, the hub tracking program 400 begins at block 402. At block 402, the hub tracking program 400 obtains data from one or more tags 180 and/or hubs 160 in communication range. In some examples, this may comprise reading one or more barcodes 186 and/or matrix barcodes 188 via a barcode scanner 168, communicating with tag communication circuitry 184 via the hub communication circuitry 164, and/or communications between hub communication circuitry 164. In some examples, the tag data obtained from the tags 180 may include sensor data read from one or more sensors 106c of the tag retaining welding asset(s) 200c, one or more identifiers, location data of the welding asset(s) 200c, and/or other data pertaining to the tag(s) 180 and/or welding asset(s) 200c. In some examples, hub data obtained from other hubs 160 may include sensor data read from one or more sensors 106b of the hub retaining welding asset(s) 200b, one or more identifiers, location data of the hub retaining welding asset(s) 200b, tag data obtained by the one or more hubs 160, and/or other data pertaining to the hub(s) 160 and/or welding asset(s) 200b. In some examples, the hub tracking program 400 may only obtain data from, and/or transmit data to, certain (e.g., authorized, paired, grouped, etc.) gateways 140, hubs 160, and/or tags 180.

In the example of FIG. 4a, the hub tracking program proceeds to block 404 after block 402. At block 404, the hub tracking program 400 determines whether the data received at block 402 includes location data for the various tags 180, hubs 160, and/or welding assets 200. In some examples, this determination may comprise parsing the tag data and/or hub data received at block 402. In some examples, this determination may instead be performed at the asset tracking server 110 by the asset tracking program 403.

In the example of FIG. 4a, the hub tracking program proceeds to block 450 if there is some missing location data. At block 450, the hub tracking program 400 determines the location of the one or more tag retaining welding assets 200c, tags 180, hub retaining welding assets 200b, and/or hubs 160 from which data was received at block 402. Block 450 is described in more detail below with respect to FIG. 4b. As shown, the hub tracking program 400 proceeds to block 406 if the data received at block 402 is not missing location data, and/or after completion of block 450.

In the example of FIG. 4a, the hub tracking program 400 obtains sensor data from the sensor 106b of the hub retaining asset 200b at block 406. After block 406, the hub tracking program 400 proceeds to block 408. At block 408, the hub tracking program 400 determines whether the location of the hub retaining asset 200b (and/or hub 160) is known. In some examples, this determination may comprise checking the hub memory circuitry 162 to see if a location is stored, checking the hub memory circuitry 162 to see if the asset tracking server 110 knows (and/or stores) the location of the hub retaining asset 200b (and/or hub 160), and/or checking whether block 450a was executed, as execution of block 450a may involve determining the location of the hub retaining asset 200b (and/or hub 160).

In the example of FIG. 4a, the hub tracking program 400 proceeds to block 450b if the location of the hub retaining welding asset 200b is not known. Block 450b is described in detail below with respect to FIG. 4b. In some examples, the determination at blocks 408 and 450b may only occur periodically (e.g., once per predetermined, programmatically determined, or otherwise set time period), rather than every time data is sent to the asset tracking server(s) 110 (and/or gateway(s) 140). In the example of FIG. 4a, if the location of the hub retaining welding asset 200b (and/or hub 160) is known, the hub tracking program 400 proceeds to block 410 where the hub tracking program 400 sends the sensor data and any other data (e.g., tag data, hub data, location data, identifiers) to the asset tracking server 110. In some examples, the data may be sent to the asset tracking server 110 through one or more intervening hubs 160 and/or gateways 140. After block 410, the hub tracking program 400 ends.

Figure 4B:
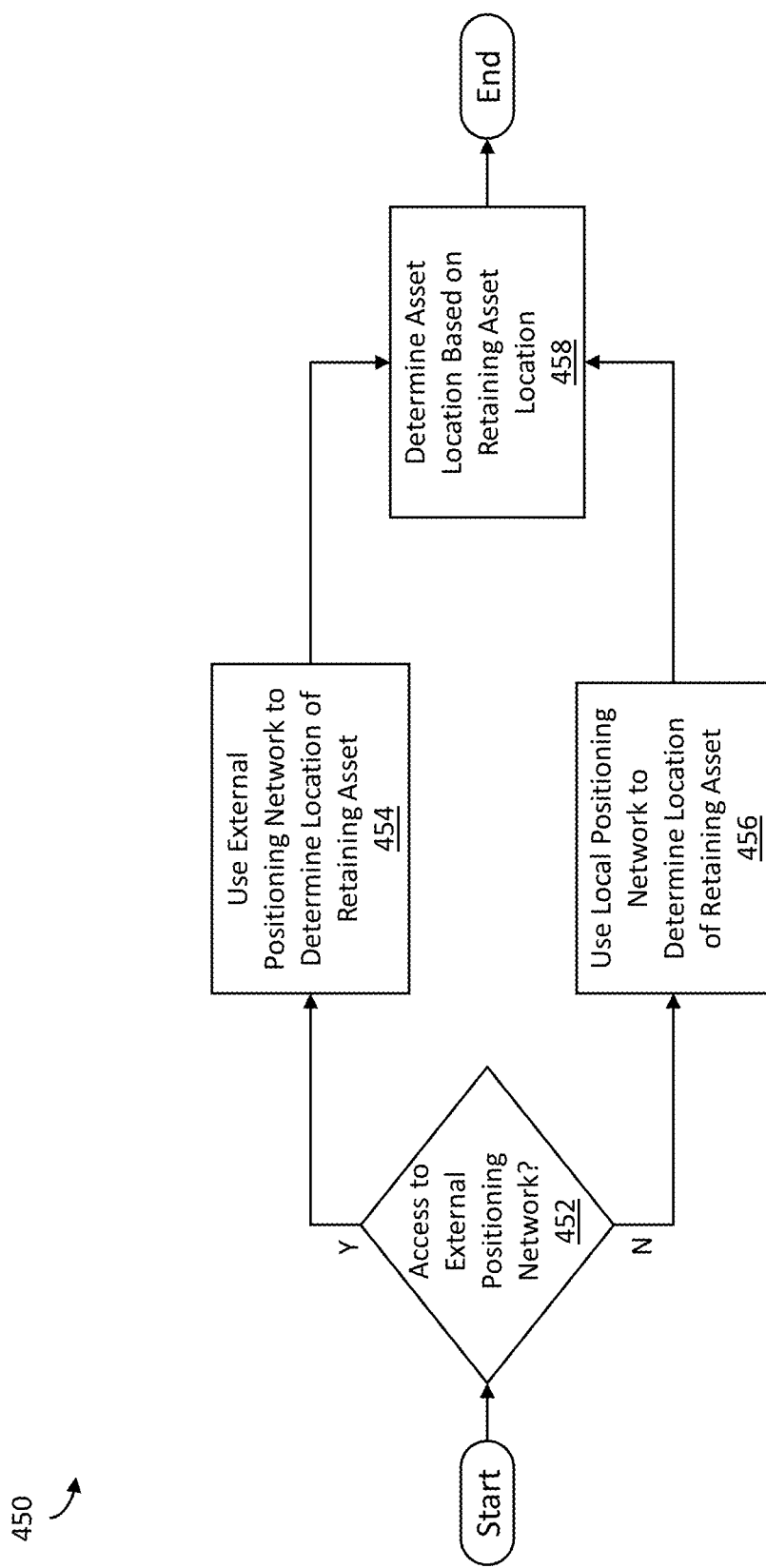

FIG. 4b is a flowchart illustrating the determine asset location(s) blocks 450a and 450b of the hub tracking program 400 of FIG. 4a in more detail. As shown, the determine asset location(s) block 450 begins at block 452, where the hub tracking program 400 determines whether the hub communication circuitry 164 is configured to access an external positioning system 108 (e.g., GPS, Wifi, and/or cellular positioning system). If so, the hub tracking program 400 proceeds to block 454 where the position of the hub retaining welding asset 200b (and/or hub 160) is determined via communication with the external positioning system 108. In some examples, the determined position may comprise an approximate position with a radius of uncertainty (e.g., position is within 30 m radius of given latitude/longitude). In some examples, the hub tracking program 400 may also use the local positioning system at block 456 (e.g., to more precisely determine the location).

If the hub tracking program 400 determines the hub communication circuitry is not configured to access an external positioning system 108, the hub tracking program 400 proceeds to block 456. At block 456, the hub tracking program 400 uses the local positioning system to determine a location of the hub retaining welding asset 200b (and/or hub 160). In some examples, this may comprise communicating (e.g., via hub communication circuitry 164) with one or more location beacons 120 in communication range of the hub 160 to obtain the one or more beacon locations 128 corresponding to the one or more location beacons 120. In some examples, the hub tracking program 400 may determine a location of the hub retaining welding asset 200b using the one or more location beacons 120. In some examples, the determined location may comprise an approximate location with a degree of uncertainty (e.g., position is within 30 m radius of given latitude/longitude, position is somewhere within welding cell 10, etc.). In some examples, the degree of uncertainty may be based at least partially on the communication range of the beacon communication circuitry 124 and/or hub communication circuitry 164 (e.g., hub 160 within communication range of beacon location 128). In examples, where more than one location beacons 120 and/or beacon locations 128 are used, the hub tracking program 400 may use trilateration and/or triangulation methods to make the location more precise.

In the example of FIG. 4b, the hub tracking program 400 proceeds to block 458 after block 454 and/or block 456. At block 458, the hub tracking program 400 determines one or more other locations of one or more other welding assets 200. In some examples, the hub tracking program 400 may determine the other locations of the one or more other welding assets 200 based on the determined location of the hub retaining welding asset 200. For example, the hub tracking program 400 may consider the communication range of the tag communication circuitry 184 with which the hub communication circuitry 164 has communicated (and/or the hub communication circuitry 164), and determine that the corresponding tag 180 and/or tag retaining welding asset 200c must be within communication range of the location of the hub 160. As another example, the hub tracking program 400 may determine that the tag data was obtained via the barcode scanner 168, and determine that the corresponding tag 180 and/or tag retaining welding asset 200c must be within a scanning of the barcode scanner 168. In some examples, the hub tracking program 400 may send the determined location(s) (and/or time(s) of the determination(s)) to the welding asset(s) 200 (and/or retained tag(s) 180, hub(s) 160, and/or gateway(s) 140) for storage in memory circuitry, and/or store the location(s) in the hub memory circuitry 162.

In some examples, block 458 may be performed by the asset tracking program 403 rather than the hub tracking program 400. For example, hubs 160 and/or gateways 140 may periodically determine their own locations and send to the asset tracking server 110 (along with their identifier(s)). Thereafter, the asset tracking program 403 may determine which hub 160 and/or gateway 140 obtained which tag data (and/or hub data) and use the last received location of the hub and/or gateway 140 to determine the location of the tag retaining welding asset 200c corresponding to the tag data (and/or hub retaining welding asset 200b corresponding to the hub data). In some examples, (e.g., at block 450b of FIG. 4a), block 458 may be skipped altogether. In the example of FIG. 4b, the determine asset location(s) block 450 of the hub tracking program 400 ends after block 458.

Figure 5:
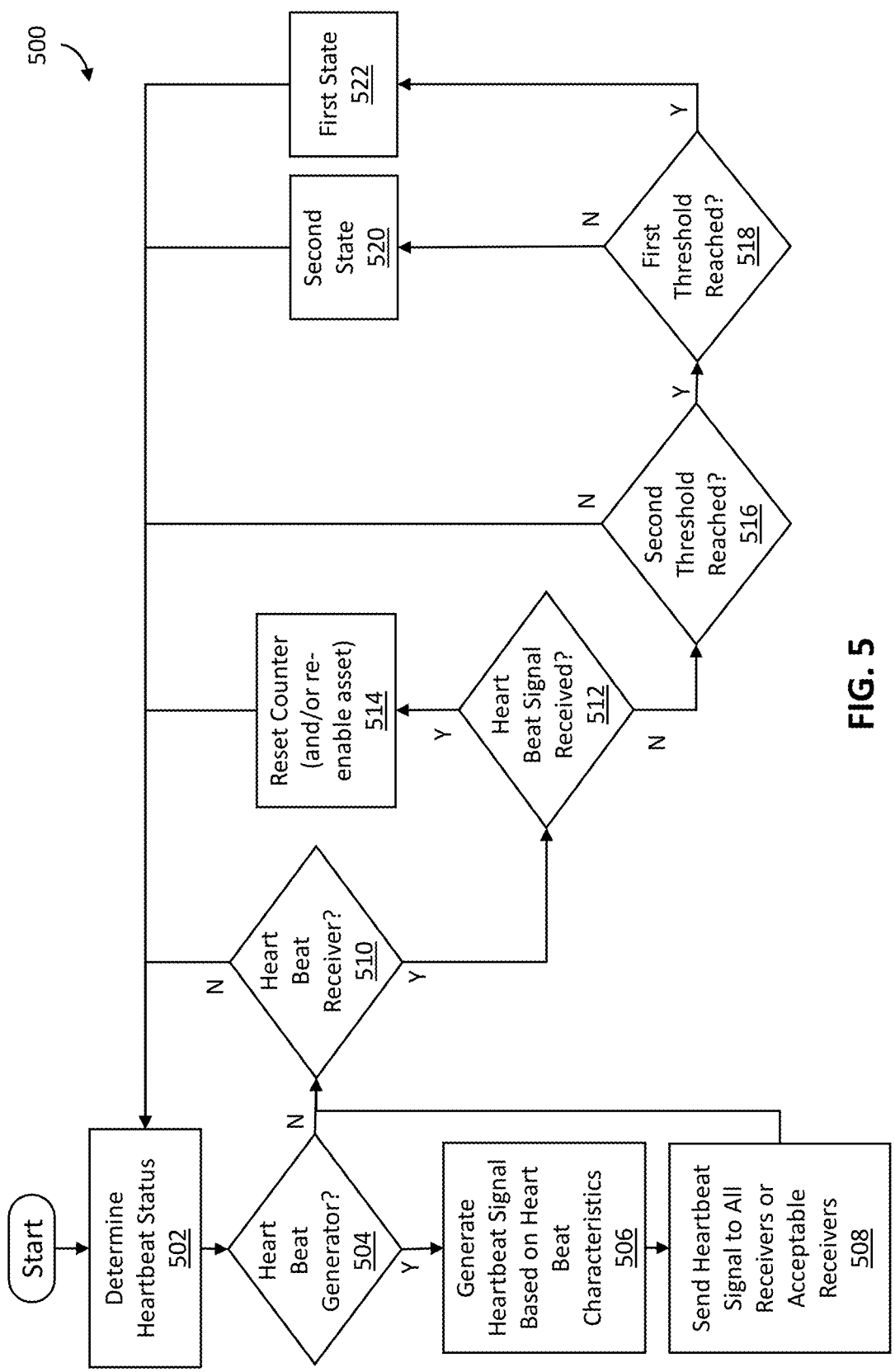
FIG. 5 is a flowchart illustrating an example hub heartbeat program of the welding asset tracking system of FIG. 1, in accordance with aspects of this disclosure.

FIG. 5 is a flowchart illustrating an example hub heartbeat program 500 of the welding asset tracking system 100 of FIG. 1. In some examples, the hub heartbeat program 500 may be implemented in computer (and/or processor) readable (and/or executable) instructions. While shown as being stored in hub memory circuitry 162 in the example of FIG. 1, in some examples, the hub heartbeat program 500 may be implemented in discrete analog and/or digital circuitry. While FIG. 5 is described in terms of the hub heartbeat program 500, in some examples, the gateway heartbeat program 501 may operate very similarly to the hub heartbeat program 500 (e.g., with respect to a gateway 140, gateway counter circuitry 141, gateway heartbeat criteria, status, signal characteristics etc., instead of a hub 160, hub counter circuitry 161, and hub heartbeat criteria, status, signal characteristics, etc.).

In the example of FIG. 5, the hub heartbeat program 500 begins at block 502, where the hub heartbeat program 500 determines a heartbeat status of the hub 160. In some examples, this determination may comprise accessing the hub heartbeat criteria of the hub heartbeat program 500. As shown, the hub heartbeat program 500 proceeds to block 504 after block 502.

In the example of FIG. 5, the hub heartbeat program 500 determines at block 504 (e.g., based on the hub heartbeat status), whether the hub 160 is and/or should act as a heartbeat generator. If not, then the hub heartbeat program 500 proceeds to block 510 (discussed below). If so, then the hub heartbeat program proceeds to block 506, where the hub heartbeat program 500 generates a heartbeat signal.

In some examples, the heartbeat signal may be generated based on stored heartbeat characteristics (e.g., of the hub heartbeat criteria). For example, the heartbeat characteristics may specify one or more frequency ranges within which the heartbeat signal should be sent and/or modulated. As another example, the heartbeat characteristics may specify one or more encodings that should be used to encrypt and/or encode the heartbeat signal. As another example, the heartbeat characteristics may specify one or more, passwords, keys, and/or identifiers that should be included in the payload of each heartbeat signal (e.g., in order to identify the heartbeat signal as acceptable to one or more gateways 140 and/or hubs 160), and/or sent during an initial "handshake" and/or pairing when communication is first established between the hub 160 and one or more heartbeat receivers. As another example, the heartbeat characteristics may specify one or more reset values (e.g., identifying one or more values to which the counter circuitry should be reset when a heartbeat signal is received) that should be included in the payload of each heartbeat signal, and/or sent during an initial "handshake" and/or pairing when communication is first established between the hub 160 and one or more heartbeat receivers.

After the hub heartbeat program 500 generates the one or more heartbeat signals at block 506, the hub heartbeat program 500 proceeds to block 508. At block 508, the one or more heartbeat signals are transmitted. In some examples, the one or more heartbeat signals may be broadcast out to all heartbeat receivers (and/or potential heartbeat receivers). In some examples, the one or more heartbeat signals may be sent in one or more transmissions targeted to specific acceptable heartbeat receivers. In some examples, the heartbeat criteria may indicate whether the heartbeat signal(s) should be broadcast or targeted.

In the example of FIG. 5, the hub heartbeat program 500 proceeds to block 510 after the transmission of the heartbeat signal(s) at block 508 (or after the hub heartbeat program 500 determines that the hub 160 should not act as a heartbeat generator at block 504). At block 510, the hub heartbeat program 500 determines (e.g., based on the hub heartbeat status), whether the hub 160 is and/or should act as a heartbeat receiver. If not, then the hub heartbeat program 500 returns to block 502. If so, then the hub heartbeat program proceeds to block 512.

In the example of FIG. 5, the hub heartbeat program 500 determines whether an acceptable heartbeat signal has been received at block 512. In some examples, the hub heartbeat criteria may define what constitutes an acceptable heartbeat signal (e.g., via the acceptable heartbeat characteristics and/or the acceptable heartbeat generators). As shown, the hub heartbeat program 500 proceeds to block 514 if an acceptable heartbeat signal has been received.

At block 514, the hub counter circuitry 161 is reset (e.g., to zero or some other reset value) and/or the hub 160 and/or hub retaining welding asset 200b is re-enabled (in case it was previously disabled, as further explained below). In some examples, the hub heartbeat program 500 may reset the hub counter circuitry 161 to some stored reset value previously provided (e.g., by one or more heartbeat signal(s), a user, such as via a connected mobile device 104, some default programming of the hub heartbeat program 500, etc.). In some examples, there may be several stored reset values, and/or the hub heartbeat program 500 may use different reset values at different times (e.g., based on which reset value has yet to be used, was used longest ago, is correlated with the current date or time, etc.). In some examples, the hub counter circuitry 161 may be manually reset (e.g., to a default, manually entered, or stored reset value), and/or the hub 160 and/or hub retaining welding asset 200b manually re-enabled, via an operator override entered via an asset interface 201 of the welding asset 200. As shown, the hub heartbeat program 500 returns to block 502 after block 514.

While not shown in the example of FIG. 5, in some examples, the hub counter circuitry 161 may proceed normally (e.g., increment or decrement as appropriate) if no heartbeat signal is received. In the example of FIG. 5, the hub heartbeat program 500 proceeds to block 516 if no heartbeat signal has been received. At block 516, the hub heartbeat program 500 checks the value of the hub counter circuitry 161 to see if the value has reached (and/or surpassed) a second threshold. In some examples, the second threshold may be stored in hub memory circuitry 162 and/or as part of the hub heartbeat program 500. As shown, the hub heartbeat program 500 returns to block 502 if the second threshold has not been reached.

In the example of FIG. 5, the hub heartbeat program 500 proceeds to block 518 if the value of the hub counter circuitry 161 has reached (and/or surpassed) the second threshold. At block 518, the hub heartbeat program 500 checks the value of the hub counter circuitry 161 to see if the value has reached (and/or surpassed) a first threshold. In some examples, the first threshold may be stored in hub memory circuitry 162 and/or as part of the hub heartbeat program 500. In some examples, the first and/or second threshold may be one or zero (e.g., when the counter circuitry is counting down, rather than up).

In the example of FIG. 5, the hub heartbeat program 500 proceeds to block 520 if the value of the hub counter circuitry 161 has not reached (and/or surpassed) the first threshold. At block 520, the hub heartbeat program 500 puts the hub 160 and/or hub retaining welding asset 200b in a second state. As shown, the hub heartbeat program 500 proceeds to block 522 if the value of the hub counter circuitry 161 has reached (and/or surpassed) the first threshold. At block 522, the hub heartbeat program 500 puts the hub 160 and/or hub retaining welding asset 200b in a first state. After blocks 520 and/or 522, the hub heartbeat program 500 returns to block 502.

In some examples, the first state and/or second state may comprise a state where the hub 160 and/or hub retaining welding asset 200b is disabled, put in a sleep or standby mode, or made to emit an alarm or warning (e.g., via an asset interface 201b of the hub retaining welding asset 200b). For example, the hub retaining welding asset 200b may be a welding power supply 202, and the first state may comprise a disabled state. In such an example, the hub heartbeat program 500 may communicate the disabled state to the power supply control circuitry 252, which may in turn control the power conversion circuitry 254 to cease outputting welding-type power. As another example, the hub retaining welding asset 200b may be a welding wire feeder 208, and the first state may comprise a disabled state. In such an example, the hub heartbeat program 500 may communicate the disabled state to the wire feeder control circuitry 260, which may in turn control the feeder motor 258 to cease driving rotation of the wire feed roller(s) 256, and/or decline to send on the torch trigger signal. As another example, the hub retaining welding asset 200b may be a welding power supply 202 or a wire feeder 208, and the second state may comprise a warning state. In such an example, the hub heartbeat program 500 may communicate the warning state to the power supply 202 or wire feeder 208, and the power supply 202 or wire feeder 208 may emit one or more perceptible (e.g., visual and/or audio) alerts, alarms, and/or warnings. In this way, a user may be warned that the welding asset 200 has been removed from an appropriate welding area (e.g., where it can receive heartbeat signals), or is otherwise not receiving heartbeat signals (e.g., due to equipment malfunction). In certain circumstances the welding asset 200 may even be put in standby mode or disabled, so as to prevent further use.

Figure 6:
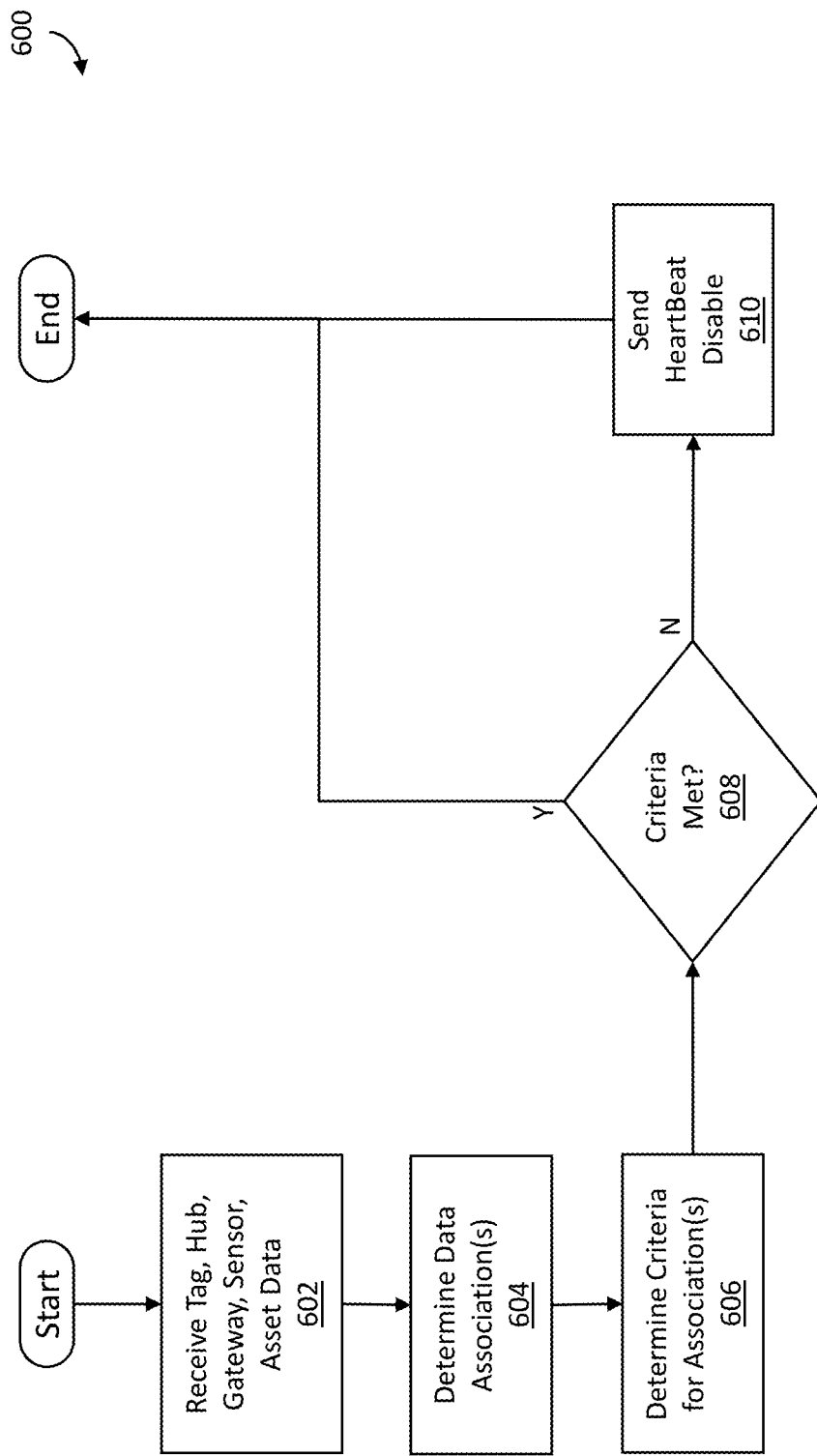
FIG. 6 is a flowchart illustrating an example server heartbeat program of the welding asset tracking system of FIG. 1, in accordance with aspects of this disclosure.

FIG. 6 is a flowchart illustrating an example server heartbeat program 600 of the welding asset tracking system 100 of FIG. 1. In some examples, the server heartbeat program 600 may be implemented in computer (and/or processor) readable (and/or executable) instructions. While shown as being stored in server memory circuitry 112 in the example of FIG. 1, in some examples, the server heartbeat program 600 may be implemented in discrete analog and/or digital circuitry.

In the example of FIG. 6, the server heartbeat program 600 begins at block 602. At block 602, the one or more asset tracking servers 110 receive gateway, hub, tag, sensor, and/or asset data from one or more gateways 140 and/or hubs 160 of the welding asset tracking system 100. In some examples, the asset tracking server(s) 110 may also store the data in the asset tracking database 118 at block 602.

As shown, the server heartbeat program 600 proceeds to block 604 after block 602. At block 604, the server heartbeat program 600 determines whether one or more subsets of the data received at block 604 should be associated together (e.g., in the asset tracking database 602). For example, sensor data obtained from multiple sensors 106 of the same welding asset 200 may be linked and/or associated. As another example, data pertaining to the same welding assets 200, or welding assets 200 of the same or similar type, welding assets 200 at the same or similar location, welding assets 200 used by the same or similar operators, and/or welding assets 200 involved the same or similar operations, may be linked and/or associated. For example, the server heartbeat program 600 may determine, from received data, that a welding power supply 202 is being used with a particular wire feeder 208 and/or wire spool 210 and/or by a particular operator (e.g., associated with a particular operator badge 224 and/or welding helmet 216), and link together the data corresponding to these welding assets 200 (and/or their associated sensors 106, tags 180, hubs 160, and/or gateways 140).

In the example of FIG. 6, the server heartbeat program 600 proceeds to block 606 after block 604. At block 606, the server heartbeat program 600 determines what, if any, criteria there are for the welding assets 200 whose data were linked and/or associated together at block 604. For example, the criteria may require that certain welding wire spools 210 be used with certain wire feeders 208, power supplies 202, and/or welding operations. As another example, the criteria may require that certain power supplies 202 and/or welding operations be performed by an operator with a certain seniority, skill level, certification level, etc. As yet another example, the criteria may require that certain welding assets 200 undergo maintenance after a certain amount of time, a certain amount of usage, before and/or after usage with certain welding assets, operators, and/or welding operations, etc. In some examples, the criteria may be stored in server memory circuitry 112 and/or as part of the server heartbeat program 600.

In the example of FIG. 6, the server heartbeat program 600 proceeds to block 608 after block 606. At block 608, the server heartbeat program 600 determines whether the received data indicates that welding assets 200 whose data were linked and/or associated together at block 604 have met the criteria determined at block 606. If so, the server heartbeat program ends. If not, the server heartbeat program 600 proceeds to block 610.

At block 610, the server heartbeat program 600 sends (e.g., via server communication circuitry 114) one or more command signals to one or more heartbeat generators of the welding asset tracking system 100. In some examples, the command signal(s) may be sent via the asset tracking network. In some examples, the one or more command signals may be representative of one or more commands to stop generating one or more heartbeat signals for the welding assets 200 who did not meet the criteria at block 608. In some examples, the server heartbeat program 600 may additionally determine which heartbeat generators and/or heartbeat signal characteristics the welding assets 200 find acceptable, and command those particular heartbeat generators and/or heartbeat signals be stopped. In some examples, the server heartbeat program 600 may instead, or additionally, send one or more signals to one or more gateways 140, hubs 160, and/or welding assets 200 indicative of the failure to meet the welding criteria (and/or the ways in which the welding criteria were not met). In the example of FIG. 6, the server heartbeat program 600 ends after block 610.

By having welding assets 200 retain the gateways 140, hubs 160, and/or tags 160, the disclosed welding asset tracking system 100 becomes more likely to have the density necessary for more granular tracking due to the tendency of welding assets 200 being positioned near other welding assets 200. Additionally, using devices with varying sophistication levels and/or costs allows the welding asset tracking system 100 to be implemented economically, and according to the sophistication levels, costs, and/or portability of the various welding assets 200. Further, the inclusion of a local positioning system allows the welding asset tracking system 100 to operate even where an external positioning system 108 is unavailable (which may sometimes be the case in certain welding areas). Finally, the use of heartbeat signals may ensure that the welding assets of the welding asset tracking system 100 are used in appropriate welding contexts and/or welding areas. In this way, the welding asset tracking server may continually receive updated information regarding each welding assets identity, location, and/or use. This updated information may be used by a welding asset manager to locate welding assets, allocate assets to different welding jobs, as well as determine whether assets should be brought in for maintenance and/or whether new assets should be acquired.

The present method and/or system may be realized in hardware, software, or a combination of hardware and software. The present methods and/or systems may be realized in a centralized fashion in at least one computing system, or in a distributed fashion where different elements are spread across several interconnected computing or cloud systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As used herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As utilized herein, the terms "e.g.," and "for example" set off lists of one or more non-limiting examples, instances, or illustrations.

As used herein, the terms "coupled," "coupled to," and "coupled with," each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

As used herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, circuitry is "operable" and/or "configured" to perform a function whenever the circuitry comprises the necessary hardware and/or code (if any is necessary) to perform the function, regardless of whether performance of the function is disabled or enabled (e.g., by a user-configurable setting, factory trim, etc.).

As used herein, a control circuit may include digital and/or analog circuitry, discrete and/or integrated circuitry, microprocessors, DSPs, etc., software, hardware and/or firmware, located on one or more boards, that form part or all of a controller, and/or are used to control a welding process, and/or a device such as a power source or wire feeder.

As used herein, the term "processor" means processing devices, apparatus, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC), a graphic processing unit (GPU), a reduced instruction set computer (RISC) processor with an advanced RISC machine (ARM) core, etc. The processor may be coupled to, and/or integrated with a memory device.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like. Memory can include, for example, a non-transitory memory, a non-transitory processor readable medium, a non-transitory computer readable medium, non-volatile memory, dynamic RAM (DRAM), volatile memory, ferroelectric RAM (FRAM), first-in-first-out (FIFO) memory, last-in-first-out (LIFO) memory, stack memory, non-volatile RAM (NVRAM), static RAM (SRAM), a cache, a buffer, a semiconductor memory, a magnetic memory, an optical memory, a flash memory, a flash card, a compact flash card, memory cards, secure digital memory cards, a microcard, a minicard, an expansion card, a smart card, a memory stick, a multimedia card, a picture card, flash storage, a subscriber identity module (SIM) card, a hard drive (HDD), a solid state drive (SSD), etc. The memory can be configured to store code, instructions, applications, software, firmware and/or data, and may be external, internal, or both with respect to the processor.

The term "power" is used throughout this specification for convenience, but also includes related measures such as energy, current, voltage, and enthalpy. For example, controlling "power" may involve controlling voltage, current, energy, and/or enthalpy, and/or controlling based on "power" may involve controlling based on voltage, current, energy, and/or enthalpy.

As used herein, welding-type refers to welding, cladding, brazing, plasma cutting, induction heating, carbon arc cutting, and/or hot wire welding/preheating (including laser welding and laser cladding), carbon arc cutting or gouging, and/or resistive preheating.

As used herein, welding-type power refers power suitable for welding, cladding, brazing, plasma cutting, induction heating, carbon arc cutting, and/or hot wire welding/preheating (including laser welding and laser cladding), carbon arc cutting or gouging, and/or resistive preheating.

As used herein, a welding-type power supply and/or power source refers to any device capable of, when power is applied thereto, supplying welding, cladding, brazing, plasma cutting, induction heating, laser (including laser welding, laser hybrid, and laser cladding), carbon arc cutting or gouging, and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

Disabling of circuitry, actuators, and/or other hardware may be done via hardware, software (including firmware), or a combination of hardware and software, and may include physical disconnection, de-energization, and/or a software control that restricts commands from being implemented to activate the circuitry, actuators, and/or other hardware. Similarly, enabling of circuitry, actuators, and/or other hardware may be done via hardware, software (including firmware), or a combination of hardware and software, using the same mechanisms used for disabling.

What is claimed is:

1. A welding asset tracking server, comprising:
   communication circuitry configured to receive welding asset data from a welding asset tracking network; and
   processing circuitry configured to:
   determine whether a welding asset data subset of the welding asset data satisfies one or more welding criteria, and
   in response to determining the welding asset data subset does not satisfy the one or more welding criteria, send a command signal from the communication circuitry to a heartbeat generator of the welding asset tracking network, the command signal being representative of a command to stop generating a heartbeat signal.

2. The welding asset tracking server of claim 1, wherein the welding asset data comprises data collected from a plurality of tags, hubs, or gateways of a plurality of welding assets, and the processing circuitry is further configured to identify the welding asset data subset based on which welding assets of the plurality of welding assets share a particular property.

3. The welding asset tracking server of claim 2, wherein the processing circuitry is further configured to identify the heartbeat generator from a plurality of heartbeat generators based on heartbeat criteria of one or more of the welding assets.

4. The welding asset tracking server of claim 2, wherein determining whether the welding asset data subset satisfies the one or more welding criteria comprises determining whether (i) a welding asset of the welding assets last underwent maintenance less than a threshold time ago, (ii) the welding asset has been used less than a threshold amount since the welding asset last underwent maintenance, (iii) the welding asset has been used by a particular welding operator since the welding asset last underwent maintenance, (iv) the welding asset has been used with a particular other welding asset since the welding asset last underwent maintenance, or (v) the welding asset has been used for a particular welding operation since the welding asset last underwent maintenance.

5. The welding asset tracking server of claim 1, wherein the welding asset data comprises data from a plurality of tags, hubs, or gateways of a plurality of welding assets, and the processing circuitry is further configured to identify the welding asset data subset based on which welding assets of the plurality of welding assets are (i) of a particular welding asset type, (ii) within a threshold distance of another welding asset, (iii) within a threshold distance of a particular location, (iv) being used by a particular welding operator, or (v) being used for a particular welding operation.

6. The welding asset tracking server of claim 5, wherein the processing circuitry is configured to identify the welding asset data subset based on which welding assets are being used by the particular welding operator, the processing circuitry being further configured to identify which welding assets are being used by the particular welding operator based on a comparison of (i) helmet data received by the communication circuitry from a welding helmet associated with the particular operator, and (ii) welding arc data received by the communication circuitry from a welding asset of the plurality of welding assets.

7. The welding asset tracking server of claim 5, wherein:
   the processing circuitry is configured to identify the welding asset data subset based on which welding assets are being used by the particular welding operator, and determining whether the welding asset data subset satisfies the one or more welding criteria comprises determining whether the particular welding operator has a certain seniority level, skill level, or certification level, or
   the processing circuitry is configured to identify the welding asset data subset based on which welding assets are being used for the particular welding operation, and determining whether the welding asset data subset satisfies the one or more welding criteria comprises determining whether a particular welding asset of the welding assets is authorized to be used for the particular welding operation, or
   the processing circuitry is configured to identify the welding asset data subset based on which welding assets are being used for a particular welding operation, and determining whether the welding asset data subset satisfies the one or more welding criteria comprises determining whether a particular type of welding consumable is being used to perform the welding operation.

8. A welding asset tracking system, comprising:
   a welding asset tracking network comprising a plurality of welding assets comprising:
      a heartbeat generator configured to generate a heartbeat signal, and
      a plurality of welding assets having a plurality of tags, hubs, or gateways; and
   a welding asset tracking server comprising:
      communication circuitry configured to receive welding asset data from the plurality of tags, hubs, or gateways of the plurality of welding assets of the welding asset tracking network; and
      processing circuitry configured to:
         determine whether a welding asset data subset of the welding asset data satisfies one or more welding criteria, and
         in response to determining the welding asset data subset does not satisfy the one or more welding criteria, send a command signal from the communication circuitry to the heartbeat generator of the welding asset tracking network, the command signal being representative of a command to stop generating a heartbeat signal.

9. The welding asset tracking system of claim 8, wherein the processing circuitry is further configured to identify the welding asset data subset based on which welding assets of the plurality of welding assets share a particular property.

10. The welding asset tracking system of claim 9, wherein the processing circuitry is further configured to identify the heartbeat generator from a plurality of heartbeat generators based on heartbeat criteria of one or more of the welding assets.

11. The welding asset tracking system of claim 9, wherein determining whether the welding asset data subset satisfies the one or more welding criteria comprises determining whether (i) a welding asset of the welding assets last underwent maintenance less than a threshold time ago, (ii) the welding asset has been used less than a threshold amount since the welding asset last underwent maintenance, (iii) the welding asset has been used by a particular welding operator since the welding asset last underwent maintenance, (iv) the welding asset has been used with a particular other welding asset since the welding asset last underwent maintenance, or (v) the welding asset has been used for a particular welding operation since the welding asset last underwent maintenance.

12. The welding asset tracking system of claim 8, wherein the processing circuitry is further configured to identify the welding asset data subset based on which welding assets of the plurality of welding assets are (i) of a particular welding asset type, (ii) within a threshold distance of another welding asset, (iii) within a threshold distance of a particular location, (iv) being used by a particular welding operator, or (v) being used for a particular welding operation.

13. The welding asset tracking system of claim 12, wherein the processing circuitry is configured to identify the welding asset data subset based on which welding assets are being used by the particular welding operator, the processing circuitry being further configured to identify which welding assets are being used by the particular welding operator based on a comparison of (i) helmet data received by the communication circuitry from a welding helmet associated with the particular operator, and (ii) welding arc data received by the communication circuitry from a welding asset of the plurality of welding assets.

14. The welding asset tracking system of claim 12, wherein:
   the processing circuitry is configured to identify the welding asset data subset based on which welding assets are being used by the particular welding operator, and determining whether the welding asset data subset satisfies the one or more welding criteria comprises determining whether the particular welding operator has a certain seniority level, skill level, or certification level, or
   the processing circuitry is configured to identify the welding asset data subset based on which welding assets are being used for the particular welding operation, and determining whether the welding asset data subset satisfies the one or more welding criteria comprises determining whether a particular welding asset of the welding assets is authorized to be used for the particular welding operation, or
   the processing circuitry is configured to identify the welding asset data subset based on which welding assets are being used for a particular welding operation, and determining whether the welding asset data subset satisfies the one or more welding criteria comprises determining whether a particular type of welding consumable is being used to perform the welding operation.

15. A method, comprising:
   receiving, at a welding asset tracking server, welding asset data from a welding asset tracking network;
   determining, via processing circuitry of the welding asset tracking server, that a welding asset data subset of the welding asset data does not satisfy one or more welding criteria; and
   in response to determining the welding asset data subset does not satisfy the one or more welding criteria, sending a command signal from the welding asset tracking server to a heartbeat generator of the welding asset tracking network, the command signal being representative of a command to stop generating a heartbeat signal.

16. The method of claim 15, wherein the welding asset data comprises data collected from a plurality of tags, hubs, or gateways of a plurality of welding assets, the method further comprising:
identifying the welding asset data subset, via the processing circuitry, based on which welding assets of the plurality of welding assets share a particular property; and
identifying the heartbeat generator from a plurality of heartbeat generators, via the processing circuitry, based on heartbeat criteria of one or more of the welding assets.

17. The method of claim 15, wherein determining whether the welding asset data subset satisfies the one or more welding criteria comprises determining whether (i) a welding asset of the welding assets last underwent maintenance less than a threshold time ago, (ii) the welding asset has been used less than a threshold amount since the welding asset last underwent maintenance, (iii) the welding asset has been used by a particular welding operator since the welding asset last underwent maintenance, (iv) the welding asset has been used with a particular other welding asset since the welding asset last underwent maintenance, or (v) the welding asset has been used for a particular welding operation since the welding asset last underwent maintenance.

18. The method of claim 15, wherein the welding asset data comprises data from a plurality of tags, hubs, or gateways of a plurality of welding assets, the method further comprising identifying the welding asset data subset, via the processing circuitry, based on which welding assets of the plurality of welding assets are (i) of a particular welding asset type, (ii) within a threshold distance of another welding asset, (iii) within a threshold distance of a particular location, (iv) being used by a particular welding operator, or (v) being used for a particular welding operation.

19. The method of claim 18, wherein the method comprises identifying the welding asset data subset, via the processing circuitry, based on which welding assets of the plurality of welding assets are being used by the particular welding operator, the method further comprising identifying which welding assets are being used by the particular welding operator based on a comparison of (i) helmet data received by the welding asset server from a welding helmet associated with the particular operator, and (ii) welding arc data received by the welding asset server from a welding asset of the plurality of welding assets.

20. The method of claim 18, wherein
the method comprises identifying the welding asset data subset based on which welding assets of the plurality of welding assets are being used by the particular welding operator, and determining whether the welding asset data subset satisfies the one or more welding criteria comprises determining whether the particular welding operator has a certain seniority level, skill level, or certification level, or
the method comprises identifying the welding asset data subset based on which welding assets are being used for the particular welding operation, and determining whether the welding asset data subset satisfies the one or more welding criteria comprises determining whether a particular welding asset of the welding assets is authorized to be used for the particular welding operation, or
the method comprises identifying the welding asset data subset based on which welding assets are being used for a particular welding operation, and determining whether the welding asset data subset satisfies the one or more welding criteria comprises determining whether a particular type of welding consumable is being used to perform the welding operation.

\* \* \* \* \*